(12) United States Patent
Hanson et al.

(10) Patent No.: US 10,846,794 B1
(45) Date of Patent: Nov. 24, 2020

(54) SYSTEMS, METHODS, AND COMPUTER PRODUCTS FOR DIRECTING CASH FLOWS ASSOCIATED WITH MORTGAGE-BACKED SECURITIES

(71) Applicant: Federal Home Loan Mortgage Corporation (Freddie Mac), McLean, VA (US)

(72) Inventors: Mark David Hanson, Potomac, MD (US); Marian J. Gora, Boca Raton, FL (US); Menner Abdullatief Tatang, Great Falls, VA (US); Kalpana Rumburg, Great Falls, VA (US); Xiaolan Pang, Thousand Oaks, CA (US); Philip Martin Dunn, Vienna, VA (US)

(73) Assignee: Federal Home Loan Mortgage Corporation (FREDDIE MAC), McLean, VA (US)

( * ) Notice: Subject to any disclaimer, the term of this patent is extended or adjusted under 35 U.S.C. 154(b) by 0 days.

(21) Appl. No.: 13/975,894

(22) Filed: Aug. 26, 2013

Related U.S. Application Data

(63) Continuation of application No. 11/473,143, filed on Jun. 23, 2006, now Pat. No. 8,521,644.

(60) Provisional application No. 60/693,405, filed on Jun. 24, 2005.

(51) Int. Cl.
*G06Q 40/04* (2012.01)

(52) U.S. Cl.
CPC .................. *G06Q 40/04* (2013.01)

(58) Field of Classification Search
CPC ...... G06Q 40/02; G06Q 20/102; G06Q 50/16; G06Q 40/00
USPC .......................................................... 705/38
See application file for complete search history.

(56) References Cited

U.S. PATENT DOCUMENTS

| | | | |
|---|---|---|---|
| 8,209,256 B1 * | 6/2012 | Konigsberg | .................... 705/38 |
| 2003/0074306 A1 | 4/2003 | Rios et al. | |
| 2003/0105708 A1 * | 6/2003 | Lee | ................... 705/38 |
| 2004/0128149 A1 | 7/2004 | Kemper et al. | |
| 2004/0128227 A1 | 7/2004 | Whipple et al. | |
| 2004/0128228 A1 | 7/2004 | Whipple et al. | |
| 2004/0128235 A1 * | 7/2004 | Kemper et al. | ................ 705/39 |
| 2004/0153384 A1 | 8/2004 | Whipple et al. | |

(Continued)

OTHER PUBLICATIONS

Albulescu, Henry C., Cash Flow Analytics for CDO Transactions; 2002; ABI/Inform; Securitization Conduit v5n 1-4 pp. 68-81.

(Continued)

*Primary Examiner* — Kirsten S Apple
(74) *Attorney, Agent, or Firm* — Finnegan, Henderson, Farabow, Garrett & Dunner, L.L.P.

(57) ABSTRACT

Systems, methods, and computer program products are provided for directing cash flows associated with a mortgage-backed security to back other securities without collapsing the original mortgage-backed security. A mortgage-backed security/an/or a set of loans is analyzed to identify cash flows from mortgages having specific desirable characteristics, and the cash flows are directed to subgroups or pools that support new mortgage-backed securities. The new securities make the desirable cash flows available to an issuer or prospective investor without collapsing the original mortgage-backed security.

20 Claims, 15 Drawing Sheets

(56) References Cited

U.S. PATENT DOCUMENTS

2004/0215553 A1    10/2004    Gang et al.

OTHER PUBLICATIONS

Business Wire; S&P Updates Subprime RMBS Default, Loss Assmptns; May 22, 2001; Newswire; 24/3,K/4 (Item 2 from file: 610).

Business Wire; S&P Rates Aquinas Funding LLC Commercial Paper 'A-1+'; Jul. 15, 1999; Business Wire; 24/3,K/5 (Item 3 from file: 610).

Ginnie Mae: "For Investors Ginnie Mae Multiclass Programs," printed on Apr. 5, 2005, from website <<http://www.ginnemae.gov/investors/inv_programs.asp?Section=Investors>> (2 pages).

Freddie Mac: "Freddie Mac's Mortgage Securities About Giant PCs," printed on Apr. 5, 2005 from website <<http://www.freddiemac.com/cgi-bin/printme/print_page.cgi?fileName=aop_giant.html&filePath=/mbs/html/aop_giant.html>> (2 pages).

Freddie Mac: "Pooling Requirements for Fixed-Rate Gold Giant PCs Effective Jul. 1, 2004," Freddie Mac chart from website (1 page).

Bhattacharya et al., "Prepayment Penalty Mortgage-Backed Securities," MBSpeak, Aug. 2005, vol. 7, Issue 5 (12 pages).

Ginnie Mae: "For Investors REMIC Structures," printed on Apr. 5, 2005, from website <<http://www.ginnemae.gov/investors/structures.asp?Section=Investors>> (3 pages).

Ginnie Mae: "For Investors Tax Considerations," printed on Apr. 5, 2005, from website <<http://www.ginnemae.gov/investors/tax.asp?Section=Investors>> (2 pages).

Freddie Mac: "Freddie Mac's Mortgage Securities About REMICs" printed on Apr. 5, 2005 from website <<http://www.freddiemac.com/cgi-bin/printme/print_page.cgi?fileName=aop_remic.html&filePath=/mbs/html/aop_remic.html>> (2 pages).

Freddie Mac: "Freddie Mac's Mortgage Securities PC Glossary of Terms" printed on Apr. 5, 2005 from website <<http://www.freddiemac.com/cgi-bin/printme/print_page.cgi?fileName=cs_terms.html&filePath=/mbs/html/cs_terms.htm>> (5 pages).

\* cited by examiner

Collateral Group 400

SYSTEMS, METHODS, AND COMPUTER PRODUCTS FOR DIRECTING CASH FLOWS ASSOCIATED WITH MORTGAGE-BACKED SECURITIES

RELATED APPLICATIONS

This is a continuation of U.S. patent application Ser. No. 11/473,143, filed Jun. 23, 2006, which claims the benefit of U.S. provisional application No. 60/693,405, filed Jun. 24, 2005. The entire contents of the above-referenced applications are expressly incorporated herein by reference.

FIELD OF THE INVENTION

The present invention generally relates to financial instruments and to systems and methods for issuing and administering the same. More particularly, the invention relates to systems and methods for directing cash flows from one or more underlying mortgage-backed securities and/or individual loans into one or more new mortgage-backed securities without decomposing or collapsing the underlying securities.

BACKGROUND

Many consumers/borrowers that purchase a home borrow funds from a lender and grant the lender a security interest in the home, which serves as collateral. The legal document whereby the consumer uses the property as collateral for repayment of the loan is commonly known as a mortgage or mortgage loan. Lenders sell many of the mortgage loans that they originate into the secondary mortgage market. The Federal Home Loan Mortgage Corporation (Freddie Mac), the Federal National Mortgage Association (Fannie Mae), and the Government National Mortgage Association (Ginnie Mae) are participants in the secondary mortgage market. By buying mortgage loans in the secondary mortgage market, participants like Freddie Mac provide lenders with capital that allows them to meet consumer demand for additional home mortgages. The secondary market for mortgage loans renders available a supply of money for housing, thus lowering the cost of money and ultimately lowering the cost of home ownership for consumers.

Secondary mortgage market buyers typically either purchase home mortgages for cash or issue securities in exchange for the mortgages. A security that is exchanged for a mortgage loan(s) is known as a mortgage-backed security (MBS). An MBS is typically a pass-through security representing an undivided beneficial interest in one or more pools of mortgage loans. An MBS is called a pass-through security because the borrowers' payments of principal and interest are passed through to holders of interests In the MBS. In general, a mortgage pool is a positively identified group of mortgage loans combined for resale to individuals or entities. An MBS may be backed by mortgage loans originated by one or more lenders.

The process of forming the mortgage pools and issuing an MBS is called securitization. MBSes, like most securities trading in the United States, are assigned a CUSIP (Committee on Uniform Securities and Identification Procedures) Identifier, which is a unique nine-character identifier that uniquely identifies the security. A CUSIP number is like a serial number; each individual security traded in the US market, such as an MBS, has a different CUSIP number that uniquely identifies it.

Conventional MBSes have been available for some time. The Tax Reform Act of 1986 (TRA 1986) eliminated many of the tax advantages of traditional real estate ownership and syndication, but offset this in part by creating an innovative tax structure that changed the way real estate mortgages could be held. The TRA 1986 authorized the creation of real estate mortgage investment conduits (REMICs) as a vehicle for creating multi-class, pass-through MBSes that resolved certain tax and balance sheet problems associated with a mortgage security called a "collateralized mortgage obligation" or CMO. A REMIC is an investment-grade mortgage security that separates mortgage pools into different maturity and risk classes and serves as a conduit for holding the mortgage pools that back it. Cash flows derived from payments of principal and interest on the underlying mortgages are passed through the REMIC structure to holders of bonds representing each REMIC class, with no income tax consequences to the REMIC structure itself.

Several years after the first REMICs were formed, secondary mortgage market buyers began to combine previously securitized, single-class MBSes to form new and larger securities backed by the assets of two or more MBSes to form a "Giant MBS." A Giant MBS is a single-class pass-through security formed by combining individual MBSes (or portions of MBSes) with other MBSes (or portions of MBSes). Giant MBSes may be known by other names throughout the industry. For example, Fannie Mae refers to a similar MBS as a "Mega."

Giant MBSes allow investors to manage their portfolios efficiently by consolidating smaller MBSes into one security. For example, an investor holding a portfolio of 100 smaller MBSes, each a separate security, has to track and account for 100 different CUSIP numbers. If the investor combines the 100 MBSes into a single Giant MBS, however, the investor has to track and account for only the single CUSIP number assigned to the Giant MBS. Forming a Giant MBS greatly reduces the internal processing and accounting costs for tracking the balance and monitoring the monthly payments associated with underlying mortgage investments, compared to the costs associated with several smaller MBSes that each pay on different schedules and may amortize at different rates. It is more economical to receive periodic payments by wire from a single Giant MBS than to receive multiple wire payments from multiple MBSes. Giant MBSes are also large and highly liquid, making them more attractive to some investors than smaller MBSes.

Other benefits of investing in Giant MBSes include: lower borrowing and security administration costs resulting in standardized pricing; Increased market liquidity; ease of trade execution; and the ready availability of comprehensive disclosures.

Giant MBSes also lower an issuer's internal processing and accounting costs because it is easier to track the balance and monitor the monthly payments for one large pool of mortgage loans rather than multiple smaller pools of mortgages. From the MBS administrator's or servicer's point of view, the economies of scale result in lower administration and transaction costs associated with the larger pool of underlying mortgage loans, and therefore dealers and financial institutions are able to charge lower rates for administration.

Moreover, by forming Giant MBSes, issuers may combine odd-sized MBSes and achieve the more standardized pricing available for large pools, such as those with aggregate loan balances in excess of $1,000,000. Giant MBSes are also more attractive to the market than smaller pool MBSes because they are more likely to meet the Bond Market Association's (BMA's) "good delivery" guidelines. The good delivery guidelines require each delivered security to meet a minimum original balance (e.g., $25,000) and have a predefined range of final maturity dates, depending on the types of securities. For example, for some 30-year securities, the predefined range of maturity dates at issuance is between 181 and 361 months to maturity; for some 15-year securities, the maturity dates must not exceed 181 months, and for other 30-year securities, there must be at least 28 years remaining from the date of issuance.

As noted above, a Giant MBS commonly contains a pool(s) of mortgage loans that generates multiple types of cash flows. Conventional REMIC classes are backed or partially backed by an undivided prorata portion of a Giant MBS, which may be prorata subdivided into risk and maturity classes. In other words, a REMIC holder receives a slice of a Giant MBS that represents a portion of the Giant MBS as a whole, such as an undivided 10% Interest in the Giant MBS. A conventional REMIC class is not associated with any specific group of loans or individual loan in the pool (i.e., a subpool) that backs the Giant MBS, such as an identified loan group that includes only mortgages with certain specified characteristics (for example, mortgage loans that were originated in Florida). A conventional REMIC cannot separate cash flows from specific subpools of mortgages contained in a Giant MBS from the overall cash flow of the Giant MBS, and a prospective REMIC holder cannot specify the characteristics of the individual mortgage loans backing a REMIC.

As a result, the value of mortgages with more favorable or more desirable characteristics in a Giant MBS is adversely affected by mortgages with less favorable or less desirable characteristics, and the total value of the Giant MBS is reduced because the market tends to value the Giant MBS as a whole based on its least desirable parts.

One way this problem might be solved is by collapsing a Giant MBS and reforming the underlying parts. For example, in order to form an MBS that contains specific mortgages, a Giant MBS and its constituent parts (whether MBSes or pools) could be disaggregated and the mortgages reformed into at least two new pools, one of which could be resecuritized into an MBS backed by desired mortgages. REMIC classes based on the new MBS could then be issued for the desired cash flows, for example, cash flows from mortgage loans that were originated in Florida.

Collapsing a Giant MBS and issuing new MBSes and REMIC classes, however, has several drawbacks. For example, a Giant MBS may not be disaggregated into its constituent pools without the consent of all holders. In many cases, gaining the consent of all holders is difficult. Another drawback is that disaggregation fragments the market by producing several small, specialized MBSes, some of which may be undesirable to investors. Another problem is that most of the benefits associated with a Giant MBS, such as size, liquidity, and transparency, are lost by disaggregation. Moreover, the process is inefficient due to costs associated with collapsing the Giant MBS and higher servicing costs associated with forming and maintaining the new MBSes.

Accordingly, it is desirable to separate cash flows having certain characteristics from a Giant MBS to support new MBSes, and to make those cash flows available to investors who want to invest in mortgage loans having only those characteristics. It is also desirable to issue MBSes (e.g., REMIC classes) backed by the cash flows from particular specified mortgages within a Giant MBS without collapsing the Giant MBS. It is also desirable to separate the cash flows generated by loans having certain desirable characteristics in a manner that maximizes as much as possible the benefits from new MBSes backed by those cash flows.

SUMMARY

Embodiments consistent with the invention include systems, methods, and computer program products for directing cash flows from mortgage-backed security collateral that include operations and components for analyzing a plurality of loans that back a mortgage-backed security to identify a first set of loans having a specific loan characteristic and a second set of loans not having the specific loan characteristic; directing cash flows from the first set of loans into a first subgroup, without collapsing the mortgage-backed security; directing cash flows from the second set of loans into a second subgroup, without collapsing the mortgage-backed security; creating a first security backed by a cash flow of the first subgroup; and creating a second security backed by a cash flow of the second subgroup.

Other embodiments consistent with the invention include systems, methods, and computer program products for directing cash flows from mortgage-backed security collateral that include operations and components for analyzing a plurality of loans that back a mortgage-backed security to identify characteristics of each loan in the plurality of loans; assigning each loan to a pool among a plurality of pools based on one or more characteristics of each loan; directing cash flows from the loans assigned to each pool to back a security associated with each pool among a plurality of securities associated with the plurality of pools, without collapsing the mortgage-backed security.

Other embodiments consistent with the invention include systems, methods, and computer program products for directing cash flows associated with a mortgage-backed security that include operations and components for creating a collateral group containing at least one mortgage-backed security; Identifying a plurality of cash flows within the collateral group generated by mortgages that comprise the collateral group, based on a plurality of characteristics of the mortgages; creating a plurality of subgroups, each corresponding to at least one of the plurality of identified cash flows; directing the plurality of cash flows to the corresponding plurality of subgroups, wherein the at least one mortgage-backed security remains intact; and issuing a security backed by at least one of the plurality of subgroups, wherein a holder of the security is entitled to at least a portion of the cash flows directed to a subgroup that backs the security.

Other embodiments consistent with the invention include systems, methods, and computer program products for directing cash flows associated with a mortgage-backed security that include operations and components for identifying a set of mortgages having specified characteristics from a plurality of mortgages; forming a collateral group containing the set of mortgages having the specified characteristics, the collateral group including at least one mortgage-backed security backed by a mortgage from the set of mortgages; creating a plurality of subgroups, each corresponding to at least one of the specified characteristics; directing cash flows from each mortgage in the collateral group to at least one subgroup of the plurality of subgroups, wherein the at least one mortgage-backed security remains intact; and backing a security with the cash flows direct to the at least one subgroup of the plurality of subgroups, wherein a holder of the security is entitled to at least a portion of the cash flows directed to the at least one subgroup that backs the security.

Advantages of the invention will be set forth in part In the description which follows, and in part will be obvious from the description, or may be learned by practice of the invention. The advantages of the invention may be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various features, embodiments and aspects of the invention and, together with the description, explain advantages and principles of the invention. In the drawings.

DESCRIPTION OF THE EMBODIMENT

Reference will now be made in detail to exemplary embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Systems and methods consistent with the present invention provide securities, such as REMICs, that selectively draw cash flows from the mortgages that are included in the collateral of a Giant MBS, without disaggregating or collapsing the Giant MBS.

Figure 1:
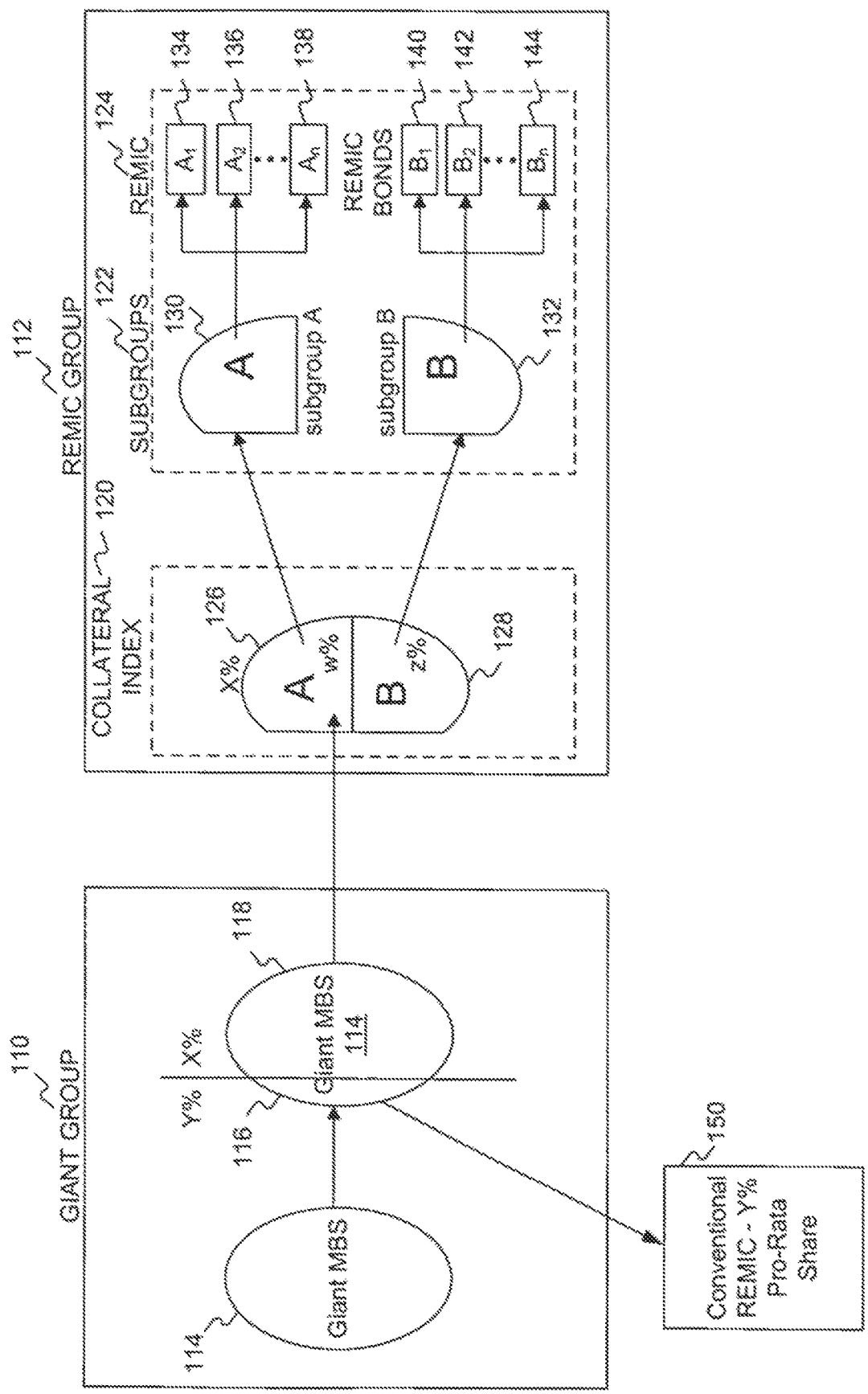
FIG. 1 is a block diagram illustrating an exemplary redirection of the cash flows associated with a single Giant MBS, in accordance with the principles of the present invention.

FIG. 1 is a block diagram illustrating an exemplary redirection of cash flows associated with a Giant MBS for a group containing one Giant MBS in accordance with the principles of the present invention. The block diagram shows two securities groups, a Giant group 110 and a REMIC group 112. The Giant group 110 contains a Giant MBS 114. As noted above, a conventional REMIC 150 is backed by a prorata portion of the Giant MBS 114. In FIG. 1, this is represented by showing Giant MBS 114 divided into two portions, with one portion 116 representing the REMIC holder's prorata Y % share of the Giant MBS, and the other portion 118 representing the remainder X % of the Giant MBS. In this example, the Y % portion 116 provides the collateral cash flow for a conventional REMIC 150, and the remainder 118 of the Giant MBS is available for other uses.

In the embodiment shown, the remainder of the Giant MBS 118 is assigned to the REMIC group 112 for identification and redirection of cash flows. One of ordinary skill will recognize that an entire Giant MBS 114, or a different sized portion 118 than that shown, could be assigned to REMIC group 112, consistent with the invention. The REMIC group 112 contains representations of three things: collateral index 120; subgroups 122; and REMIC classes 124. In collateral index 120, portion 118 of Giant MBS 114 is analyzed to identify specific cash flows and their corresponding mortgage pools within the Giant MBS 114.

In one embodiment consistent with the invention, a software application performs the collateral index function by searching a database containing the mortgage loans or pools that make up Giant MBS 114 to identify mortgage loans or portions of pools having specified characteristics, attributes, or factors. Mortgages may be identified and pooled or grouped with other like mortgages based on many factors and characteristics, including, but not limited to, the term of the mortgage loan, the interest rate, whether the mortgage loan has a fixed interest rate, adjustable interest rate, or balloon payment feature, whether the mortgage loan was purchased for cash or purchased in exchange for a guaranteed MBS, the identity of the mortgage loan originator, the amount of the original loan balance, the mortgage loan purpose (e.g., purchase or refinance), the mortgaged property's characteristics (e.g., main residence, vacation home, investment property, owner occupied), whether the mortgage loan is seasoned or unseasoned, the geographic location of the mortgaged property (GEO), the weighted average coupon (WAC), the weighted average maturity (WAM) (e.g., the number of months left to maturity), the loan to value ratio (LTV), whether the mortgage loan has a low loan balance (LLB), and the borrowers credit score. These characteristics may be disclosed or available to investor or the market. In one embodiment, the same software application may also group the identified mortgage loans into a pool by setting a pool identifier in each mortgage's database entry. In another embodiment, grouping may be performed using pooling optimization techniques to maximize or minimize specific characteristics or attributes of a mortgage pool(s) or subgroup and thus the corresponding security(s) backed by cash flows from the pool(s).

For clarity of explanation, FIG. 1 illustrates the identification of only two different mortgage pools, pool A 126 and pool B 128, which could be formed from underlying securities or loans that support Giant MBS 114, (e.g., the X % portion 118 of conventional REMICs (not shown) that back Giant 114). Pool A 126 accounts for w % of the portion 118 of Giant MBS 114, and pool B 128 accounts for z % of the portion 118 of Giant MBS 114. The present invention, however, allows for the identification of any number of mortgage pools and associated cash flows. As noted, there are numerous characteristics that can be used to pool or select certain mortgage loans, and the reasons for choosing various characteristics differ depending, for example, on what types of mortgages are included in the Giant MBS, the characteristics of the current market, investor preferences, market demand for certain cash flows, and various other factors. Pools with different characteristics are likely to have eligible candidate mortgage overlap, as a single mortgage may have characteristics that qualify it for two or more pools. In one embodiment consistent with the invention, each mortgage is placed in only one pool. In another embodiment, a single mortgage may belong to more than one pool. In both embodiments, these pools are formed without breaking up, or disaggregating, or collapsing the Giant MBS. In other words, the Giant MBS continues to exist as a security and continues unaffected to provide cash flow to holders of an interest in the Giant MBS, such as a holder of a conventional REMIC 150.

The pooled mortgage loans that comprise the Giant MBS have available a portion of their cash flows for redirection into new securities. In FIG. 1, the available portion is X % 118 of the total cash flow from Giant MBS 114. The available cash flows are separated and directed into subgroups 122 that are used to back different classes of a REMIC or multiple single-class securities. A subgroup, such as subgroup 130 or subgroup 132, represents the source from which the Giant MBS collateral cash flows are directed to back specific REMICs or single class securities. There are numerous variations of subgroups that are consistent with the present invention. For example, as illustrated in FIG. 1, each subgroup 122 can be created from a single identified cash flow. FIG. 1 shows two subgroups: subgroup A 130 represents the cash flow from the mortgages in pool A 126 of the Giant MBS 114, and subgroup B 132 represents the cash flow from the mortgages in pool B 128 of the Giant MBS 114. In other embodiments, multiple cash flows from multiple pools from one or more Giant MBSes back one or more subgroups.

As shown, less than 100% of the total cash flow from Giant MBS 114 may be available to support subgroups 122 and REMIC 124, because, for example, holders of conventional REMICs 150 may not provide their REMICs for participation in the formation of new REMICs 125. The participation percentage of a particular pool within a subgroup is determined by multiplying the percentage of the Giant MBS 114 included in the pool by the percentage of the Giant MBS assigned to the REMIC group 112. For example, the participation percentage of pool A 126 within subgroup A 130 is calculated as follows:

Participation Percent (Pool $A$)=$w$ %*$X$ %.

Likewise, the participation percent of pool B 128 within subgroup B 132 is calculated as follows:

Participation Percent (Pool $B$)=$z$ %*$X$ %.

Participation percent denotes the amount of underlying securities available for the REMIC tranches or classes. Participation percent may help identify the relative size of the contribution of certain types of collaterals, e.g. whether the collaterals backing the REMIC tranches come mainly from loans with certain identified characteristics or not.

As noted above, a subgroup is used to back a multiple class security such as a REMIC or one or more single class securities. In the embodiment illustrated in FIG. 1, Subgroup A is used to back a REMIC with classes $A_1$ 134, $A_2$ 136, through $A_n$ 138; and subgroup B is used to back a REMIC with classes $B_1$ 140, $B_2$ 142, through $B_n$ 144. Each subgroup can back any number of REMIC classes, 1 through n, as illustrated In FIG. 1. Moreover, a REMIC may be backed by more than one subgroup. In the embodiment shown, the securities are REMIC multi-class securities. Other embodiments may create multiple single class securities or a mix of multi-class and single-class securities.

In one embodiment consistent with the invention, the process of directing cash flows from the Giant MBS into new securities is based upon a potential investor's preferences. In this embodiment, the cash flows in a Giant MBS(es) are identified, for example. In the index phase 120, and they are disclosed to the potential REMIC investor. Alternatively, the Giant MBS(es) may be provided by the potential REMIC investor, in which case the investor may be aware of what types of mortgages are underlying the Giant MBS and available for backing one or more REMICs. In either case, the potential REMIC investor may provide input as to what cash flows he or she wishes to break out into separate securities. Based on this input, the securities-creation process is tailored to generate subgroups and REMIC classes consistent with the potential REMIC investor's wishes. For example, if an investor wishes to create or purchase a REMIC class backed by only mortgage loans that were originated in Florida, embodiments consistent with the invention create such a REMIC class without collapsing the Giant MBS(es) that contains the subset of Florida originated mortgage loans. Generally, each class (or tranche) in a REMIC is issued as an individual security that can be sold, bought, etc. The relevant subset of underlying mortgages is pooled, and then the resulting cash flow from that pooled subset of mortgages may be directed, (which includes the combining and slicing cash flow approaches), to provide the required cash flow of the corresponding REMIC class(es). Continuing the last example, the mortgages that were originated in Florida are identified, pooled, and directed into a particular subgroup that is used to back a REMIC having the desired Florida GEO characteristic.

Other embodiments consistent with the invention can accommodate more complex requests from a potential MBS or REMIC investor, MBS issuer, Giant MBS holder, or other interested party. For example, an investor may specify that he or she wishes to buy a REMIC class backed by a combination of High Loan Balance (HLB) mortgages, high weighted average coupon (WAC) mortgages, and adjustable rate (AR) mortgages. To accommodate this, the HLB, WAC and AR cash flows within a Giant MBS(es), and/or portions of a Giant MBS(es), may be identified and directed into a single subgroup that is used to back a REMIC class, which is sold to the investor. Embodiments consistent with the invention provide this ability without collapsing the Giant MBS, thus maintaining the Giant MBS's benefits of size, liquidity, and transparency, and avoiding the costs associated with collapsing the Giant MBS.

Figure 2:
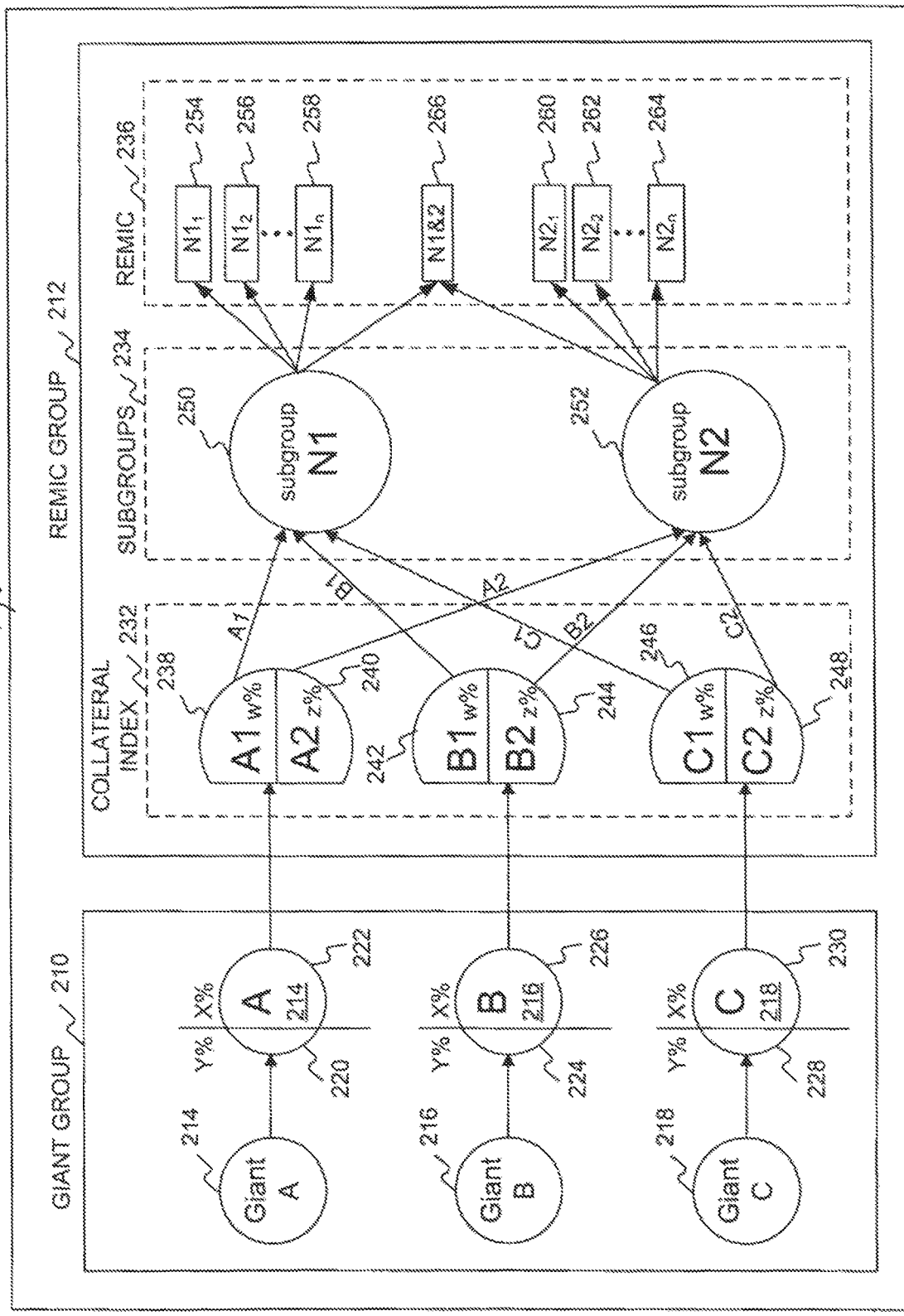
FIG. 2 is a block diagram illustrating an exemplary redirection of cash flows associated with a Giant MBS for a group containing more than one Giant MBS, in accordance with the principles of the present invention.

FIG. 2 is a block diagram illustrating an example of directing cash flows for a group containing more than one Giant MBS in accordance with the principles of the present invention. This embodiment directs cash flows from a group that contains several Giant MBSes. As shown in FIG. 2, all cash flows being redirected belong to Giant MBSes within the same group, such as an Offering Circular Supplement (OCS) group. In one embodiment, an OCS group, or collateral group, is used to group the collaterals in such a way that each group contains similar types of collaterals. The OCS or collateral group may be illustrated to include the REMIC class group, because typically each REMIC tranche is derived from one collateral group.

In FIG. 2, the process of directing cash flows from a Giant MBS to a new security is organized under two groups, the Giant group 210, and the REMIC group 212. Giant group 210 contains three different Giant MBSes, Giant MBS A 214, Giant MBS B 216, and Giant MBS C 218. In the embodiment shown, the Giant MBSes are partially used for other purposes, so a prorata portion of each Giant MBS is unavailable for creating subgroups. As shown, Giant MBS A 214 is divided into a Y % prorata portion 220, and X % portion 222. Giant MBS B 216 and Giant MBS C 218 are similarly divided. The Y % portions may be used for purposes such as, for example, backing a conventional REMIC. The size of the prorata portions is not critical to the invention. For convenience, each Giant MBS is shown with the same size portions Y % and X %, but this need not be the case. Also, an entire undivided Giant MBS (not shown) may be used to provide cash flows for the REMIC group 212.

The remaining portions (X %) of Giant MBS A 222, Giant MBS B 226, and Giant MBS C 230 are used for the REMIC group. In the collateral index part 232 of the REMIC group, each Giant MBS portion is analyzed to identify specific cash flows. As shown, cash flows $A_1$ 238 and $A_2$ 240 are identified within the available portion of Giant MBS A, where cash flow $A_1$ 238 accounts for w % of Giant MBS A 214 and cash flow $A_2$ 240 accounts for z % of Giant MBS A 214. Cash flows $B_1$ 242 and $B_2$ 244 are identified within the available portion of Giant MBS B, where cash flow $B_1$ 242 accounts for w % of Giant MBS B 216 and cash flow $B_2$ 244 accounts for z % of Giant MBS B 216. Cash flows $C_1$ 246 and $C_2$ 248 are identified within the available portion of Giant MBS C 218, where cash flow $C_1$ 246 accounts for w % of Giant MBS C 218 and cash flow $C_2$ 248 accounts for z % of Giant MBS C 218. As previously explained, the illustrated cash flows are exemplary and any number of cash flows may be identified within a specific Giant MBS. The illustrated percentages w % and z % are arbitrary and not critical to the invention. For illustration in this example, the same percentages are used for each Giant MBS portion; they need not be the same, but will vary according to the mortgages in each Giant MBS and the desired loan/cash flow characteristics. Determining which loans or pools within a Giant MBS are used to produce a certain cash flow may involve an optimization algorithm or technique designed to produce the most valuable or market-desirable group of REMIC securities. As noted previously, cash flows are identified based on specified characteristics of the underlying mortgages that make up the collateral of the Giant MBSes in Giant group 210.

As shown in REMIC group 212, two different subgroups 234 are created to direct the Giant MBSes' cash flows: subgroup N1 250 and subgroup N2 252. The cash flows identified in the Collateral Index 232 of the REMIC group 212 are directed to the appropriate subgroups. As shown in FIG. 2, cash flows $A_1$ 238, $B_1$ 242, and $C_1$ 246 are directed into subgroup N1 250; and cash flows $A_2$ 240, $B_2$ 244, and $C_2$ 248 are directed into subgroup N2 252. Creating subgroups from a plurality of cash flows from a combination of multiple Giant MBSes, as shown in this embodiment, allows flexibility in creating subgroups, and consequently securities, with specific characteristics to satisfy customer demand. For example, cash flows A1, B1, and C1 may be generated by variable-interest-rate loans, providing subclasses $N1_{1 \ldots n}$ to a customer demand for securities backed by variable-interest-rate loans.

Considering the identification and division of mortgages in collateral index phase 232 into subgroups 234, one of ordinary skill will appreciate that determining how to best allocate the available collateral loans or mortgage pools among the subgroups is a difficult and complex problem. For example, how to determine the most desirable percentage A1 238 of the available portion 222 of Giant A 214 to allocate to subgroup N1 250, which backs REMIC classes 254-258 and 266, is a difficult and complex problem because there may be many mortgage pools, portions of mortgage pools, individual mortgage loans, etc. having characteristics that qualify them for inclusion in more than one subgroup 234, especially where a subgroup is formed based on multiple loan characteristics. As mentioned previously, determining which subgroup to place collateral in may be straight forward, such as being determined by the presence or absence of a single characteristic, or it may require more sophistication, such as an algorithm that takes into account collateral characteristics, output security characteristics, market prices, and other factors.

One embodiment consistent with the invention employs a pooling optimization engine to determine which subgroup available collateral should be placed in. In one implementation consistent with the invention, a computer application allows a user to evaluate a specific pooling-related business strategy and select a specific optimization methodology to help make pooling decisions for placing loans into specific subgroups 234. The application implements a pooling optimization engine (POE) that may execute various optimization algorithms for flexibly selecting pooling criteria, with the goal of creating the most desirable allocation of collateral loans to securities. The most desirable allocation may, for example, generate the highest selling price for the resulting REMIC securities 236 in the appropriate market. One of ordinary skill will recognize that criteria other than or in addition to highest selling price may be used to determine the most desirable allocation of collateral loans to securities, and that embodiments employing optimization using other, or additional, criteria are within the scope of the invention.

Participation percent for the embodiment illustrated in FIG. 2 is determined using the same equation discussed in connection with FIG. 1. The participation percent of a particular pool within a subgroup is determined by multiplying the percentage of the Giant MBS included in the pool by the percentage of the Giant MBS assigned to the REMIC group. For example, the participation percent of pool $A_1$ 238 within subgroup N1 250 is calculated as follows:

$$\text{Participation Percent (Pool } A_1) = w\ \% \ (A_1) * X\ \% \ (\text{Giant MBS } A).$$

Likewise, the participation percent of pool $B_1$ 242 and pool $C_1$ 246 within subgroup N1 250 are calculated as follows:

$$\text{Participation Percent (Pool } B_1) = w\ \% \ (B_1) * X\ \% \ (\text{Giant MBS } B),$$

$$\text{Participation Percent (Pool } C_1) = w\ \% \ (C_1) * X\ \% \ (\text{Giant MBS } C).$$

Using the same equation, the participation percent of pools $A_2$ 240, $B_2$ 244, and $C_2$ 248 within subgroup N2 252 are calculated as follows:

Participation Percent (Pool $A_2$)=z % ($A_2$)*X % (Giant MBS $A$),

Participation Percent (Pool $B_2$)=z % ($B_2$)*X % (Giant MBS $B$),

Participation Percent (Pool $C_2$)=z % ($C_2$)*X % (Giant MBS $C$).

As illustrated in FIG. 2, each REMIC may have any number of REMIC classes (1 through n). Subgroup N1 250 is used to back REMIC classes $N1_1$ 254 and $N1_2$ 256 through $N1_n$ 258, and subgroup N2 252 is used to back REMIC classes $N2_1$ 260 and $N2_2$ 262 through $N2_n$ 264. In addition, both subgroup N1 250 and subgroup N2 252 are used to back REMIC class N1&N2 266. In general, a REMIC class may be supported by more than one subgroup.

Figure 3:
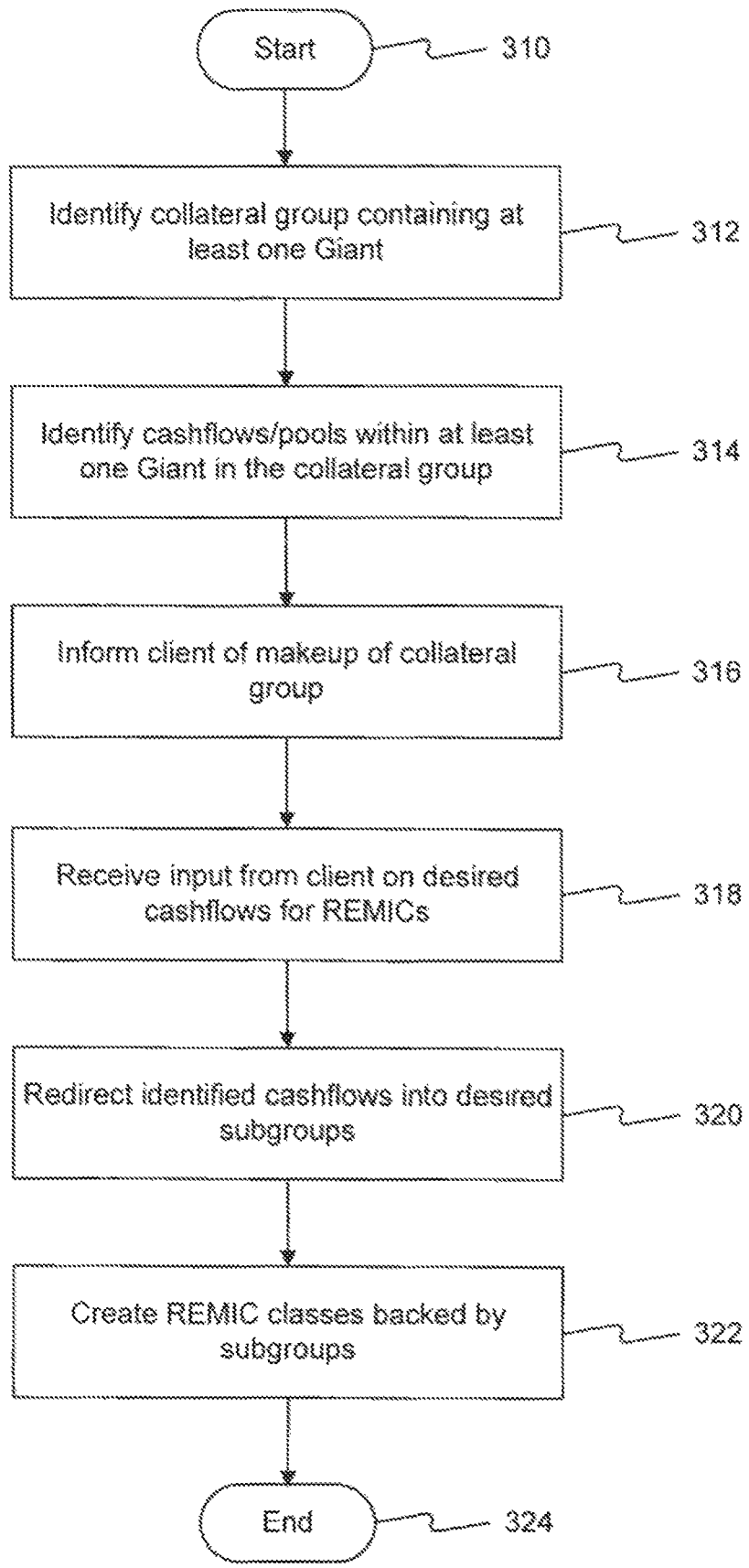
FIG. 3 is a flow chart of exemplary steps for redirecting cash flows associated with a Giant MBS, in accordance with the principles of the present invention.

FIG. 3 is a flow chart of exemplary steps for directing cash flows associated with a Giant MBS consistent with the invention. In step 312, a group containing at least one Giant MBS is identified, such as group 200 in FIG. 2. In one embodiment, this occurs when a Giant MBS holder wishes to discern other investment possibilities for his or her Giant MBS. In another embodiment, a group may be identified by analyzing a portfolio of Giant MBSes and finding those that have at least a portion of their cash flows available for directing into new securities.

As shown in FIGS. 2 and 3, only a portion of the Giant(s) (e.g., x %) need be available for redirection of cash flows to back new MBSes. Thus, only a subset of the current beneficial holders of the Giant(s) need consent to redirection of cash flows and provided their interests for inclusion in collateral 118. In contrast, collapsing the Giant(s) to reorganize the cash flows to back new MBSes requires the consent of all beneficial holders of the Giant(s), because the Giant(s) will cease to exist, affecting the holders' interests.

In one embodiment consistent with the invention, identification is performed by a software application that analyzes a database containing data about the Giant MBSes and specifically about the loans that ultimately underlie the Giant MBS. In another embodiment consistent with the invention, identification is performed by investors, either manually or automatically. In either case, the process may typically require some subjective decisions and market information, such as market demand, market value, etc.

In step 314, specific cash flows within each Giant MBS are identified. As noted above, there are many factors that can be considered singly or in combination when analyzing a Giant MBS to identify and pool the mortgages that generate a specified type of cash flow. In one embodiment consistent with the invention, a software application is used to perform this identification. For example, a database management program may accept query criteria to identify mortgages that generate specific cash flows, such as UPB %>75% to identify the group of mortgage loans within a Giant MBS that have more than a 75% unpaid principal balance. Typically, issuers or servicers of Giant MBSes track information, or provide "disclosure," at the mortgage pool level. In other words, the granularity of the information regarding the underlying collateral is at the level of the underlying mortgage pools. Embodiments consistent with the invention may also include information tracked down to the individual loan level.

After the Giant MBS(es) have been analyzed, in step 316 a client, such as the Giant MBS holder, a potential investor, or any entity that can issue REMICS, is informed of the cash flows identified, for example, via a report detailing the percentages, amounts, etc. of mortgage loans with various characteristics.

In step 318, the client provides feedback regarding the cash flows it is interested in, if any, for backing REMICs, REMIC classes or other new MBSes. For example, an investor could choose the bucket or type of cash flow that they are interested in by notifying the REMIC issuer or securitization shelf. In step 320, subgroups are created that are designed to back desired securities, and the identified cash flows are directed into the applicable subgroups. The contributing Giant MBSes remain intact. The creation of subgroups may involve an optimization algorithm that tries to form subgroups from the available collateral so as to produce the most valuable or desirable group of securities backed by the subgroups. The value or desirability of a subgroup may be related in whole or part to specific factors, attributes, or characteristics of the mortgages pooled into a subgroup(s) that provides the cash flow for the security. In the embodiment shown, the creation of subgroups is based on feedback received from the client, in step 318, which may include desired loan factors, attributes, or characteristics. After the client-requested subgroups have been formed, there will typically be leftover mortgages in the Giant MBS group that do not have any of the desired characteristics. In one embodiment, these leftover mortgages are pooled and their cash flows directed to a separate subgroup that supports a separate security class or security, which may be unissued. In step 322, the subgroups are used to back REMIC classes and the desired REMIC is created. As previously discussed, a REMIC class may be backed by a single subgroup or by a combination of subgroups.

One of ordinary skill will recognize that the steps shown in FIG. 3 may be changed, deleted, or supplemented without departing from the principles of the invention. For example, steps 316 and 318 may be deleted, such that the subgroups and REMIC classes are formed without client input. In such an embodiment, subgroups and REMIC classes may be formed based on market demand or predicted market value.

Although the above described embodiments use existing Giant MBSes to provide specific cash flows to back new REMIC classes, other embodiments of methods and systems consistent with the present invention create new Giant MBSes and/or groups of collateral for the same purpose. Instead of analyzing existing Giant MBSes to identify cash flows and the mortgages that generate them to ultimately back a REMIC class, other embodiments create a new Giant MBS designed to generate specific cash flows. In such embodiments, pooling optimization techniques and algorithms may be used to create the new Giant MBS in a manner that maximizes the desirability of the resulting REMICs, e.g., by pooling loans with desired characteristics or attributes to generate the cash flows for at least some of the resulting REMICs.

Figure 4:
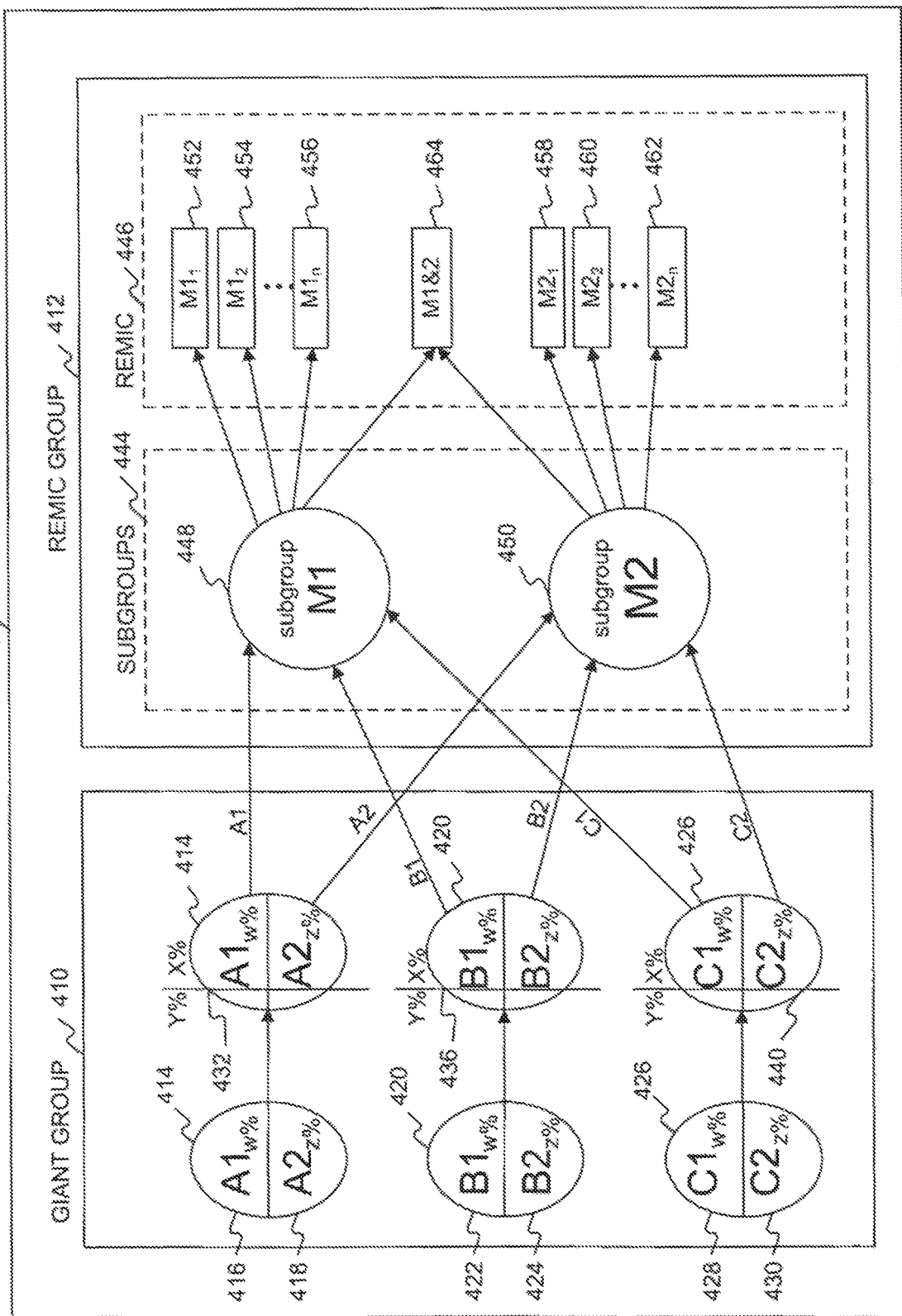
FIG. 4 is a block diagram illustrating an exemplary redirection of cash flows associated with a Giant MBS for a group containing Giant MBSes with identified cash flows. In accordance with the principles of the present invention.

Still other embodiments identify existing Giant MBSes having desirable cash flows, i.e., desirable mortgage collateral, and place them in a group so the cash flows can be used to back new securities. FIG. 4 is a block diagram illustrating an exemplary redirection of Giant MBS cash flows for a Giant group containing Giant MBSes with pre-identified cash flows in accordance with the principles of the present invention. In this embodiment, Giant MBSes are analyzed and cash flows are identified before they are placed in group 400. This allows the composition of Giant MBSes in collateral group 400 to be optimized to support the desired REMIC subgroups 444. Analyzing the Giant MBSes before forming a group that will supply the REMIC collateral allows tailoring the creation of group 400 so that it contains Giant MBSes with similar or complimentary pools of mortgage loans with desired characteristics. For example, Giant MBSes containing a high percentage of mortgage loans originated in Florida may be placed in a group to support a large Florida-originated REMIC class. As another example, the Giant MBSes for group 400 could be chosen to minimize the size of the remainder class, which has mortgage loans with characteristics that do not interest potential REMIC investors. In addition, analyzing the Giant MBSes before placing them in the Giant group 410 allows a buyer wishing to purchase a conventional prorata REMIC to have information regarding the characteristics of the mortgage loans contained in the prorata share of the Giant MBS that is backing the conventional REMIC.

The cash flows of the Giant MBSes used to populate the Giant group 410 of the group 400 are directed to subgroups 444, which represent the sources for directing the Giant MBSes' cash flows to specific REMIC securities. In FIG. 4, the Giant group 410 contains three Giant MBSes, Giant MBS A 414, Giant MBS B 420, and Giant MBS C 426. Each Giant MBS has been analyzed, (which may involve optimization techniques), and its cash flows identified before being placed in Giant group 410, as shown by the pool divisions of each Giant MBS. Specifically, FIG. 4 shows pools $A_1$ 416 and $A_2$ 418 within Giant MBS A 414, with pool $A_1$ 416 accounting for w % of Giant MBS A 414, and pool $A_2$ 418 accounting for z % of Giant MBS A 414. Further, Giant MBS B 420, contains pools $B_1$ 422 and $B_2$ 424, with pool $B_1$ 422 accounting for w % of Giant MBS B 420, and pool $B_2$ 424 accounting for z % of Giant MBS B 420. Giant MBS C 426 contains pools $C_1$ 428 and $C_2$ 430, with pool $C_1$ 428 accounting for w % of Giant MBS C 426, and pool $C_2$ 430 accounting for z % of Giant MBS C 426. As with the other examples, the percentages w % and z % are arbitrary illustrations, and need not be the same for each Giant MBS.

FIG. 4 illustrates an example in which prorata portions (Y %) 432, 436 and 440 of each Giant MBS are unavailable to back REMIC 446, for example, in the case where holders purchase conventional REMICs backed by Y % prorata portions before or after the Giant MBSes were analyzed and the cash flows identified. In this embodiment, the REMIC group 412 does not illustrate a collateral index phase because the cash flows within each Giant MBS have already been identified in the Giant group 410.

The REMIC group 412 includes subgroups 444, such as subgroup M1 448 and subgroup M2 450. The cash flows identified in the Giant group 410 are directed into the subgroup that backs the REMIC classes corresponding to the cash flows. As shown in FIG. 4, cash flows $A_1$ 416, $B_1$ 422, and $C_1$ 428 are directed into subgroup M1 448; and cash flows $A_2$ 418, $B_2$ 424, and $C_2$ 430 are directed into subgroup M2 450. As shown, subgroups may include multiple cash flows from multiple Giant MBSes.

Similar to what was mentioned with respect to FIG. 2, determining which Giant MBSes 414, 420, and 426, to include in a collateral group 400 used to produce desired REMICs 446, and/or determining which mortgage loans to include in a Giant MBS, such as Giant MBSes 414, 420, or 426 to produce subgroups 444 that will produce the most desirable cash flows for backing REMICs 446, are difficult and complex problems. Some embodiments consistent with the invention may use a pooling optimization model to choose MBSes for Giant group 410 and/or allocate collateral loans to subgroups 444 underlying REMICs 446 so as to maximize or minimize a specific characteristic(s) of the cash flows of REMICs 446.

The participation percent for each collateral Giant MBS 414, 420, and 426 for the embodiment shown In FIG. 4 is determined using the same equation provided for FIG. 1 and FIG. 2. To determine the participation percent of a particular pool within a subgroup, the percentage of the Giant MBS included in the pool is multiplied by the percentage of the Giant MBS assigned to the REMIC group. For example, the participation percent of pool $A_1$ (416) within subgroup M1 (448) is calculated as follows:

Participation Percent (Pool $A_1$)=w % ($A_1$ 416)*X % (Giant MBS A 414).

Likewise, the participation percent of pool $A_2$ 418 within subgroup M2 450 is calculated as follows:

Participation Percent (Pool $A_2$)=z % ($A_2$ 418)*X % (Giant MBS A 414).

The participation percentages for pools $B_1$ 422, $B_2$ 424, $C_1$ 428, and $C_2$ 430 are calculated in the same manner.

The subgroups 444 direct the cash flows from the collateral Giant MBSes into various classes of a REMIC 448, such as classes $M1_1$ 452 through $M1_n$ 456, M1&2 464, and $M2_1$ 458 through $M2_n$ 462.

Figure 5:
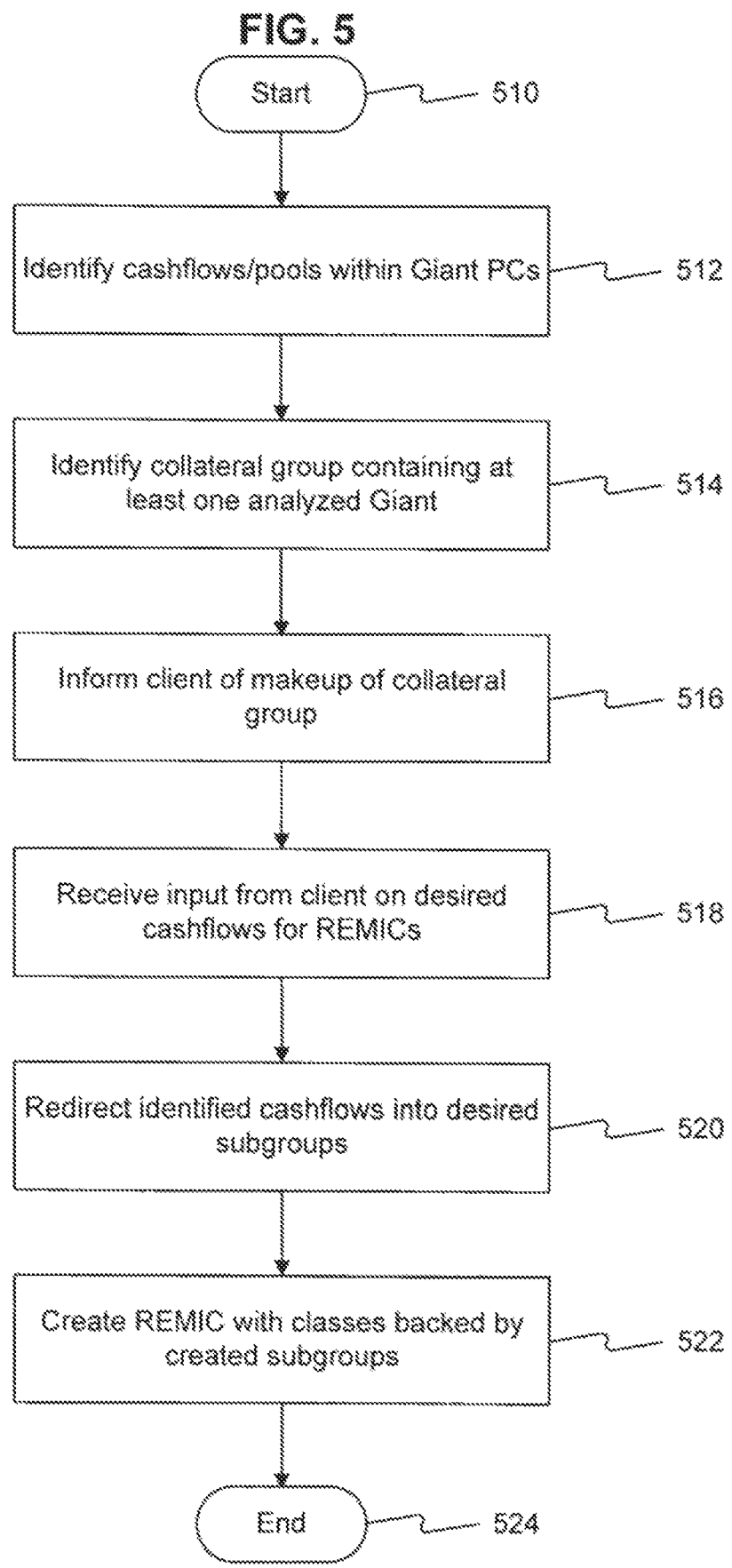
FIG. 5 is a flow chart of exemplary steps for redirecting cash flows associated with a Giant MBS for a group containing Giant MBSes with identified cash flows, in accordance with the principles of the present invention.

FIG. 5 is a flow chart of exemplary steps for directing cash flows from a collateral group containing Giant MBSes having identified cash flows, consistent with the invention. In step 512, a group of Giant MBSes is analyzed and specific cash flows within each Giant MBS are identified. As previously discussed, there are many factors and characteristics that can be used to identify cash flows and the underlying mortgages that generate them within a Giant MBS, and any one characteristic or combination of characteristics can be used to screen the mortgages underlying a Giant MBS. In one embodiment, a software application searches and analyzes a database containing information about the mortgage loans in a Giant MBS, and identifies the mortgage loans having the characteristics supplied as input for the database search. The choice of Giant MBSes to include in the collateral group may involve an optimization algorithm that tries to select Giant MBSes from the available Giant MBSes so as to form a group that will produce valuable or desirable securities backed by the Giant MBSes' collateral.

In step 514, a group containing at least one Giant from the group of analyzed Giant MBSes is created for use as collateral. By choosing Giant MBSes having certain desired cash flows for inclusion, the collateral group can be customized and optimized to support the subgroup or subgroups needed for a desired REMIC class or classes. For example, for a desired REMIC issue containing: 1) a seven-year adjustable-rate mortgage cash flow REMIC class, and 2) a vacation home, 15-year fixed-rate mortgage cash flow REMIC class, the available group of Giant MBSes may be analyzed to identify those comprised of at least 40% seven year adjustable rate mortgages and/or at least 15% 15-year fixed rate vacation home mortgages, and the identified Giant MBSes may then be placed in the collateral group associated with the desired REMIC. One of ordinary skill will recognize that these identification thresholds (e.g., 40% and 15%) are exemplary and may be adjusted to optimize the selection of Giant MBSes for inclusion in the collateral group that backs a desired REMIC. One embodiment consistent with the invention uses a database query application to identify Giant MBSes containing mortgages having specific characteristics.

In step 516, a client, such as an investor, a holder of a Giant MBS in the collateral group, or a securities issuer, is informed of the cash flows that were identified in each Giant MBS available for the collateral group. Then, in step 518, the client provides feedback regarding what cash flows it is interested in, if any, for backing REMICs or REMIC classes. That is, the type of cash flow is tied to the type of mortgage required to back the REMIC. In step 520, subgroups are created and the identified cash flows are directed into the applicable subgroups. In the embodiment shown, the creation of subgroups and REMIC classes, and the selection of Giant MBSes for inclusion in the collateral group is based on feedback received from a client or clients, but in other embodiments, client participation is not necessary (e.g., steps 516 and 518 may be replaced with optimization steps, or eliminated). In yet other embodiments, Giant MBSes are selected for collateral and subgroups and REMIC classes are created based on marketing expectations, perceived or predicted market demand, or other factors.

In step 522, the subgroups are created to back securities and the desired REMIC, REMICs, or other MBSes are created. A REMIC or REMIC class may be backed by a single subgroup or by a combination of subgroups.

In another embodiment consistent with the present invention, customized Giant MBSes are created based on the analysis and identification of cash flows In MBSes and/or an unsecuritized group of loans, and the Giant MBSes are used to create a collateral group whose cash flows are used to back REMIC classes. The creation of customized Giant MBSes may involve an optimization algorithm that tries to form Giant MBSes from the available mortgage loans and MBSes so as to produce a Giant MBS that will produce the most valuable or desirable group of securities backed by the Giant MBS. The Giant MBS structure is used to aggregate, from available mortgage loans and/or smaller MBSes that are not yet associated with a Giant MBS, mortgage loans having specific characteristics, such as mortgage loans with geographic diversity, or mortgage loans with a geographic concentration, or mortgage loans with short weighted average remaining maturities (WARM). For example, an issuer may perceive that there is desirable value in a pool that is structured to reduce the prepayment variation (achieved through greater geographic diversity), or that there is desirable value in a pool with short WARM. In some embodiments, several custom-built Giant MBSes (or portions thereof) may be combined, and the specific cash flows from these Giant MBSes may be directed to REMIC class securities or other new MBSes.

Figure 6:
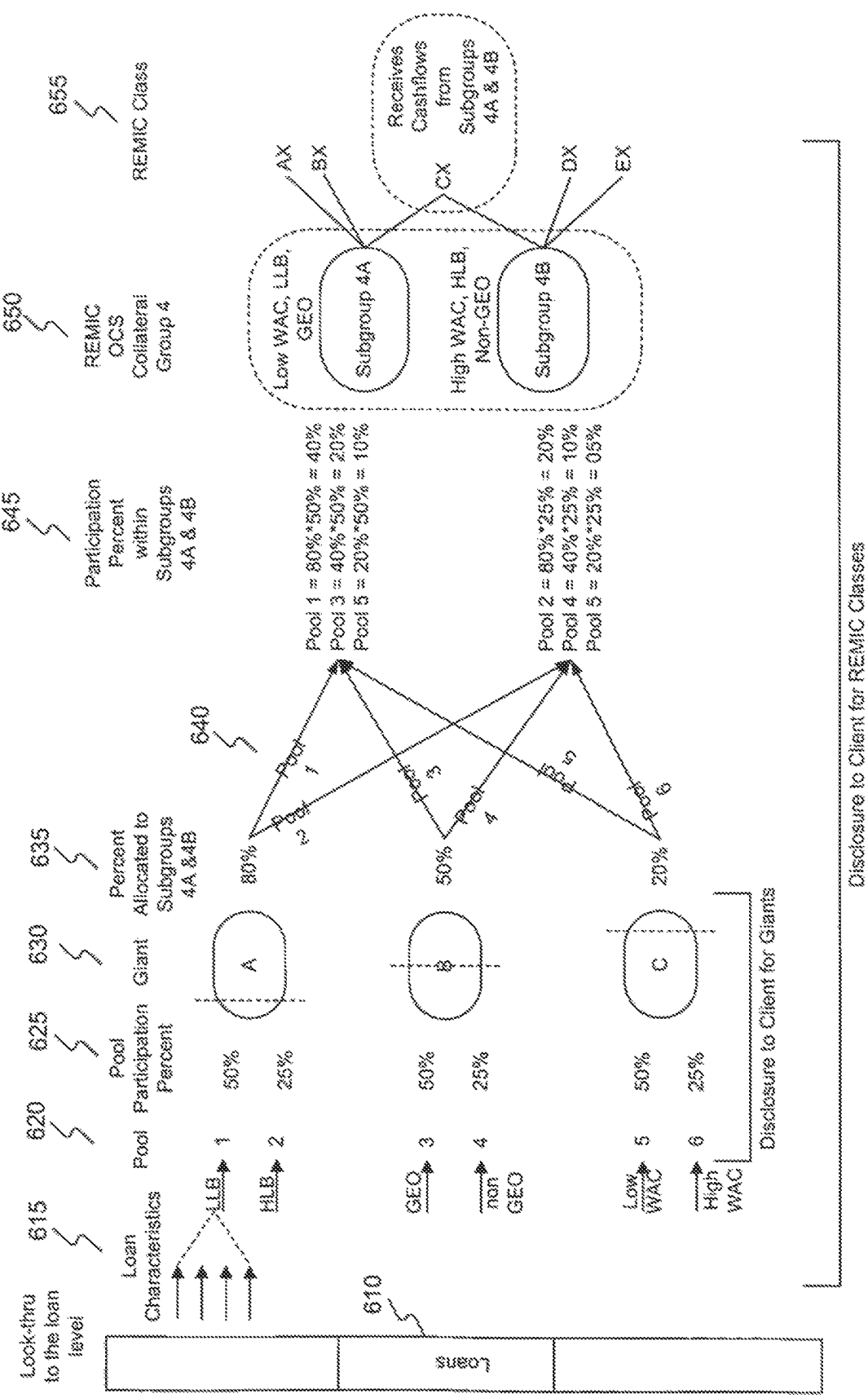
FIG. 6 is a block diagram illustrating an exemplary direction of cash flows associated with several Giant MBSes, in accordance with the principles of the present invention.

FIG. 6 is another block diagram illustrating an exemplary directing of cash flows for a collateral group containing three Giant MBSes in accordance with the principles of the present invention. In the example shown, the goal is to create a REMIC with classes 655 backed by a collateral group 650 having two subgroups: Subgroup 4A that represents cash flows from desirable mortgage loans characterized by Low Weighted Average Coupon (WAC), LLB, and being within a specified geographic origination area (GEO), and subgroup 4B that represents cash flows from less desirable mortgage loans characterized by High WAC, HLB, and being outside the specified geographic origination area. To accomplish this, the mortgage loans 610 that comprise Giant MBSes 630 are identified by loan characteristics 615, such as Low Loan Balance (LLB) and High Loan Balance (HLB); within a specified GEO and not within a specified GEO; and Low Weighted Average Coupon (WAC) and High WAC. The mortgage loans are formed into six different pools 620 corresponding to their identified characteristics and the Giant they back. The pool participation percentage for each characteristic within its Giant MBS 630 is shown under pool participation percent 625. For example, 50% of the loans in Giant A have the LLB characteristic. Assigning the loans into pools 620 and subgroups 650 may involve techniques for optimizing the desirability of the resulting REMICs, which may be a complex problem because, among other things, a given loan may have characteristics the qualify it for inclusion in more than one pool 620, so a choice must be made as to the most desirable placement of the loan. As shown in FIG. 6, the pools are allocated according to their characteristics to either subgroup 4A or subgroup 4B as indicated by arrows 640.

The percentage 635 of each Giant MBS 630 allocated to the REMIC subgroups, which are considered the REMIC OCS Collateral group 650, is multiplied by the pool participation percent 625 of each characteristic within the Giant MBSes to determine each pool's participation percent within subgroups 4A and 4B 645.

REMIC classes 655 AX and BX are backed by the Low WAC, LLB, GEO mortgage pools represented by subgroup 4A. REMIC classes DX and EX are backed by the High WAC, HLB, non-GEO mortgage pools represented by subgroup 4B. REMIC class CX is backed by the mortgage pools represented by both subgroups 4A and 4B. The Giant MBSes 630 remain intact, yet a purchaser or investor may invest in just the Low WAC, LLB, GEO cash flows contained in Giant MBSes 630 by purchasing REMIC classes AX, BX, or CX. Similarly, a purchaser may invest in just the Giant MBSes' High WAC, HLB, and non-GEO cash flows without collapsing the Giant MBSes via REMIC classes DX, EX, and CX. Because Giant MBSes 630 are not disaggregated in forming the REMIC subgroups, portions of the Giant MBSes may be available for investors or purchasers interested in a conventional investment in a prorata portion of a Giant MBS.

Figure 7:
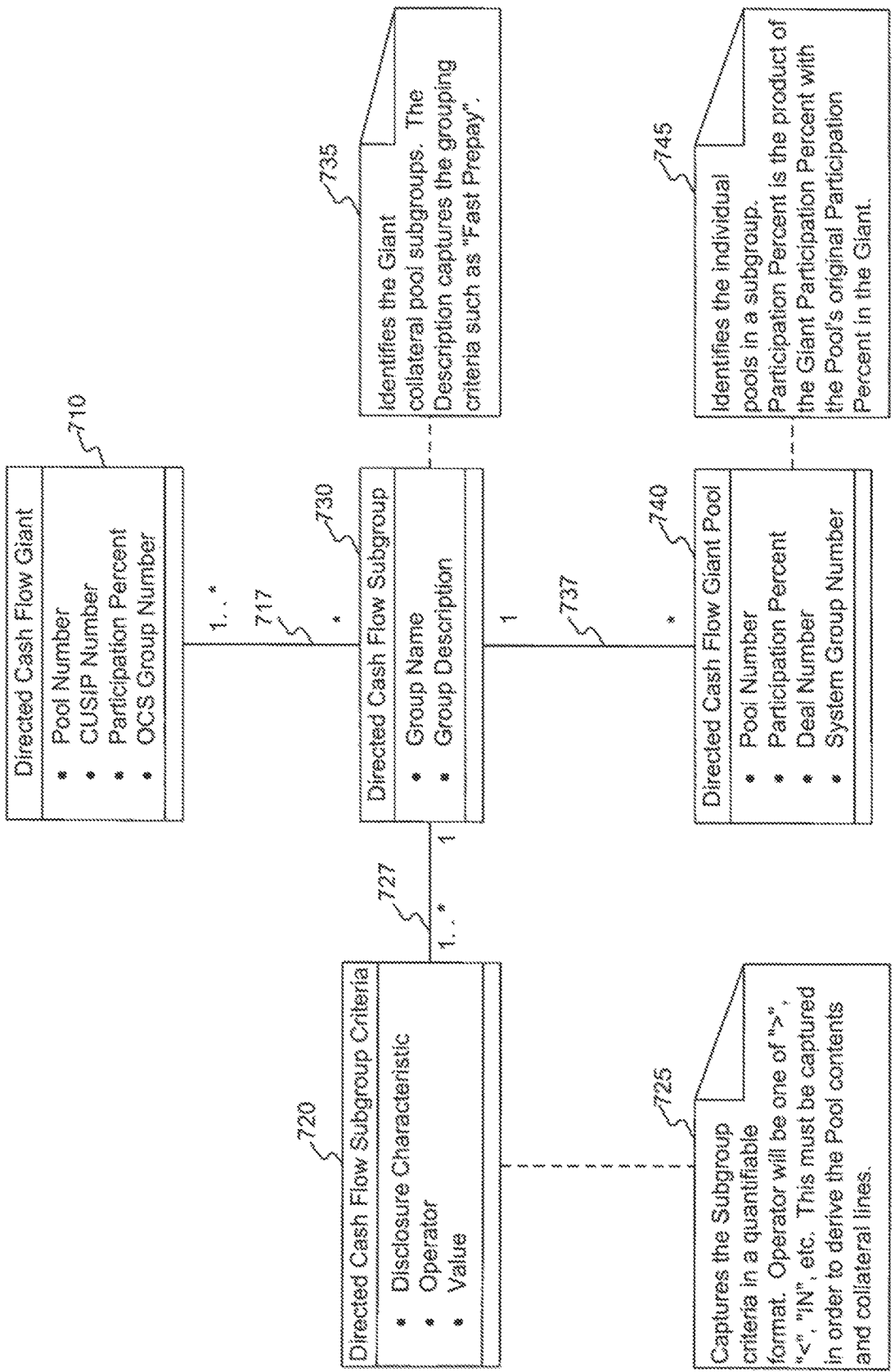
FIG. 7 is a block diagram illustrating exemplary logical entities underlying a software application used in an embodiment consistent with the present invention.

FIG. 7 is a block diagram illustrating exemplary logical entities underlying a software system embodiment consistent with the present invention. One of ordinary skill in the art will recognize that the logical entities may represent database entries and object-oriented programming objects that can be used to implement a system consistent with the invention, such as an object-oriented software application that accesses a relational database. One of ordinary skill will also recognize that multiple instances of each logical entity may be needed for each instantiation of an embodiment consistent with the invention.

As shown, a Directed Cash Flow Giant MBS logical entity 710 includes several information fields or attributes, including a Pool Number, a CUSIP Number that uniquely identifies the Giant MBS, a Participation Percentage available for use with directed cash flows, (such as X % portion 222 of Giant MBS A 214 in FIG. 2), and an OCS Group Number denoting the Giant MBS's collateral group. A Giant MBS has a unique identification used by the securitization program or issuer, and this identification is called pool number. The pool number, however, may not be unique across different issuers.

In the example shown, a Directed Cash Flow Subgroup logical entity 730 includes a Group Name field and a Group Description field. As shown in entity note 735, the Directed Cash Flow Subgroup logical entity 730 identifies the subgroups, such as subgroup N1 250 in FIG. 2. A line 717 connecting the Directed Cash Flow Giant MBS logical entity 710 and Directed Cash Flow Subgroup logical entity 730 represents a relationship between the two entities. The notation "1 . . . *" where line 717 connects to the Directed Cash Flow Giant MBS logical entity 710 signifies that at least one, or more, Giant MBS is associated with each subgroup. The notation "*" where line 717 connects to the Directed Cash Flow Subgroup logical entity 730 signifies that zero or more subgroups may be associated with each Giant MBS.

In the example shown, a Directed Cash Flow Subgroup Criteria logical entity 720 includes a Disclosure Characteristic field that indicates a mortgage loan characteristic or factor, an Operator Field that indicates, for example, a logical, Boolean, or mathematical operation or relationship, and a Value field that indicates a quantity or threshold. As shown in entity note 725, the Directed Cash Flow Subgroup Criteria logical entity 720 captures the Subgroup criteria in a quantifiable format, such as may be used to query a database or otherwise identify specific mortgages. For example, a subgroup criteria to identify mortgages for properties that are occupied by the owner may be specified as "Occupancy=Owner," where the Disclosure Characteristic is "Occupancy," the Operator is "=," and the Value is "Owner."

Line 727 connecting the Directed Cash Flow Subgroup Criteria logical entity 720 and Directed Cash Flow Subgroup logical entity 730 represents a relationship between the two entities. As noted above, the notation "1 . . . *" where line 727 connects to the Directed Cash Flow Subgroup Criteria entity 720 signifies that at least one, or more, criteria is associated with each subgroup. The notation "1" where line 727 connects to the Directed Cash Flow Subgroup logical entity 730 signifies that one subgroup is associated with each criteria.

A Directed Cash Flow Giant MBS Pool logical entity 740 includes a Pool Number field that uniquely identifies the pool, a Participation Percentage field that indicates the percentage of the pool available for use with subgroups, a Deal Number field that indicates a corresponding number for a group of REMIC classes, and a System Group Number field that indicates a corresponding sub-group number for directing cash flow. As shown in entity note 745, the Directed Cash Flow Giant MBS Pool logical entity 740 identifies the pool(s) of mortgage loans that back a subgroup. Line 737 connecting the Directed Cash Flow Giant MBS Pool logical entity 740 and Directed Cash Flow Subgroup logical entity 730 represents a relationship between the two entities. As noted above, the notation "*" where line 737 connects to the Directed Cash Flow Giant MBS Pool entity 740 signifies that zero or more pools may be associated with each subgroup. The notation "1" where line 737 connects to the Directed Cash Flow Subgroup logical entity 730 signifies that one subgroup is associated with each pool for the example shown.

Pooling Optimization

Figure 8:
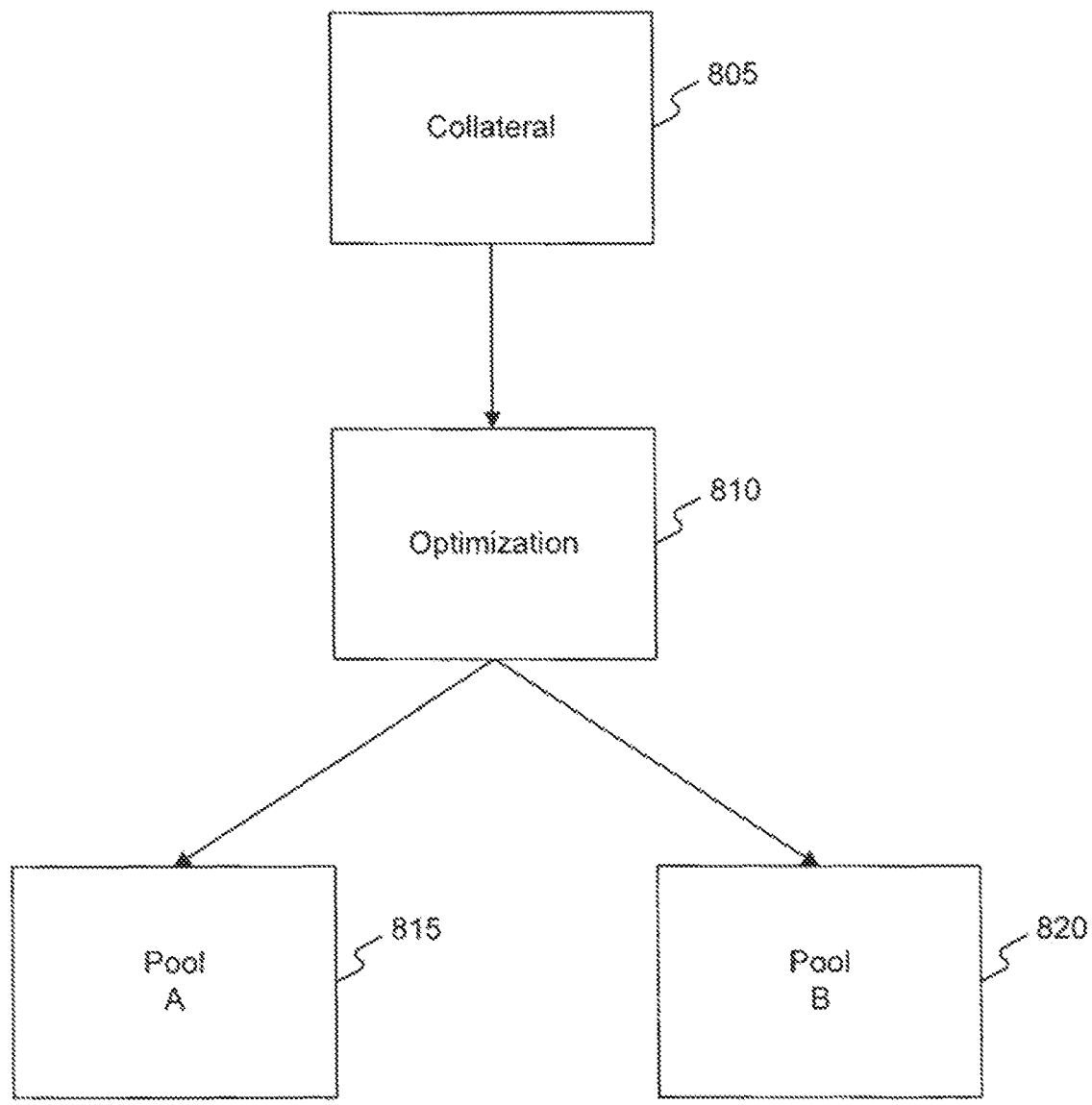
FIG. 8 is a block diagram representing an exemplary pool optimization architecture consistent with the principles of the invention.

FIG. 8 is a block diagram representing an exemplary pool optimization architecture consistent with the principles of the invention. As shown, an optimization process 810 receives as input collateral 805, such as a group of mortgage loans, and produces as output optimized collateral pools, such as collateral pool 815 and collateral pool 820, which may, for example, comprise mortgage loans from the input collateral 805 separated into two or more defined groups or pools according to a specific set of criteria. In one embodiment, optimization process 810 is designed, for a given set of input collateral loans, to group the loans into pools that most nearly maximize the most valuable or otherwise desirable cash flows among the collateral 805 for association with mortgage-backed securities, where the cash flows are generated by loans having specific characteristics or attributes.

Optimization process 810 may use one or more algorithms or strategies, perhaps in the alternative, to arrive at a pooling solution(s). Optimization process 810 may be implemented in software, hardware, or a combination of the two.

In one embodiment, optimization process 810 utilizes rules engine technology. Rules engine technology provides the ability to centralize business logic, such as pooling criteria, so that it can be easily changed (thus changing the operation of optimization process 810), for example, to quickly meet new customer demands, regulatory changes, and competition in the marketplace.

Figure 9:
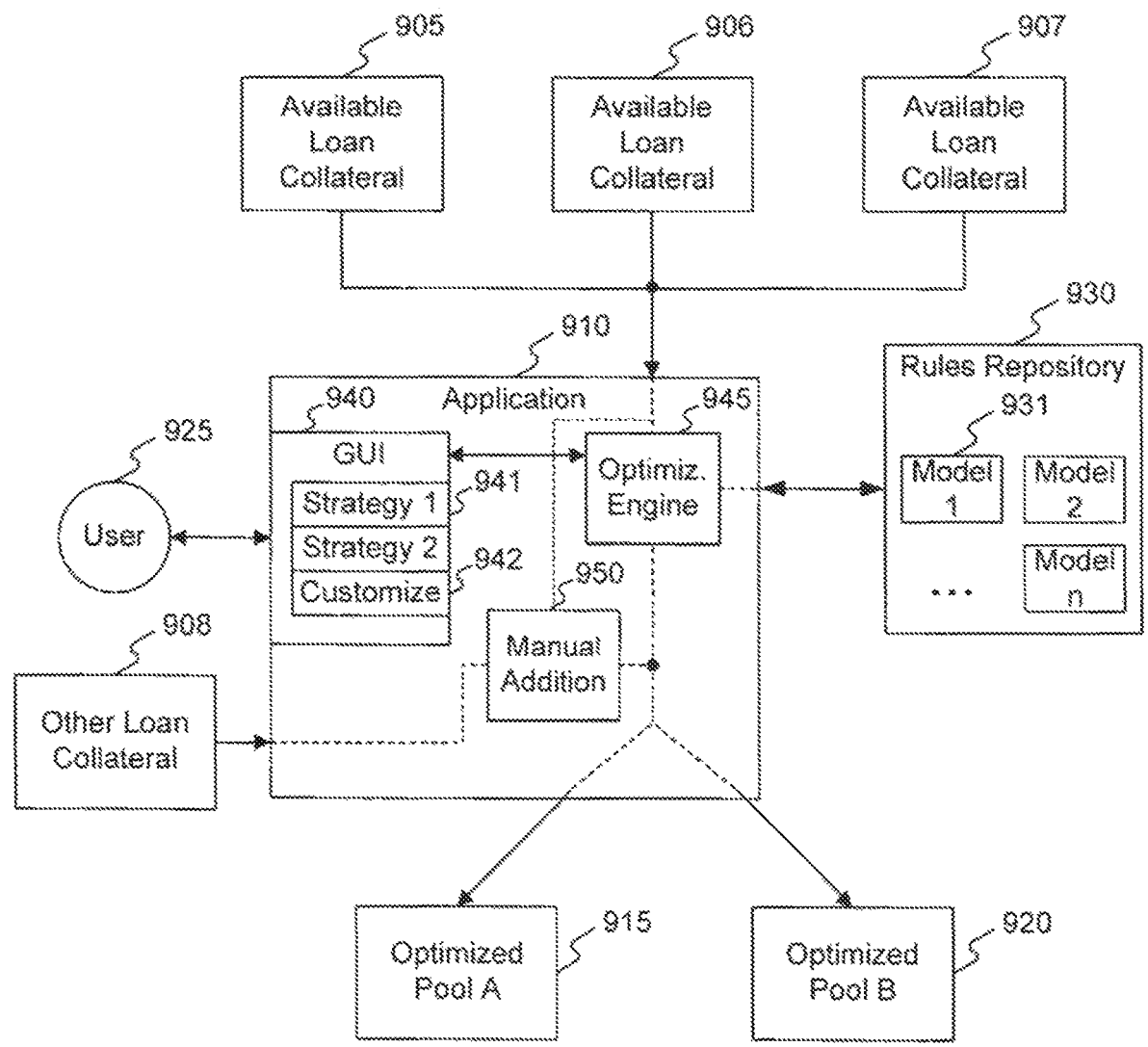
FIG. 9 is a block diagram representing an exemplary rules-based pool optimization architecture consistent with the principles of the invention.

FIG. 9 is a block diagram representing an exemplary rules-based pool optimization architecture consistent with the principles of the invention. As shown, an application 910 uses collateral, such as available loan collateral 905, available loan collateral 906, available loan collateral 907, and other loan collateral 908 to form optimized loan pools. Collateral may include, for example, the loans of a Giant MBS(es), the loans of other types of MBSes, or unsecuritized loans.

In one embodiment, application 910 analyzes data about each loan in available loan collateral 905, available loan collateral 906, available loan collateral 907, and other loan collateral 908, including characteristics or attributes of each loan. In some embodiments, a user may have the ability to select the source of information about loan attributes, such as the ability to access a variety of databases or files containing collateral loan information, despite differences in format, field layout, etc. In some embodiments, a user may have the ability to edit the accessed INFORMATION and make data corrections as needed, for example via a GUI 940 with a customize function 942.

In the embodiment shown, application 910 includes an optimization engine 945, a GUI 940, and a manual addition module 950. In some embodiments, optimization engine 945 uses a rules engine and mixed integer linear program optimization solver implementation for the loan pool optimizer. Rules engines, rules, and mixed integer linear program optimization solvers are known in the art and the exact implementation is not critical to the invention.

GUI 940 is a graphical user interface that enables a user 925 to interact with and direct the operation of application 910. GUI 940 may allow user 925 to create user profiles, view data (e.g., about the loans in available loan collateral), run optimization engine 945, view optimization results (e.g., the loans in optimized output pools), modify the composition of the optimized pools, choose an optimization strategy 941 to employ, etc. In one embodiment, via a customize option 942, GUI 940 may allow a user 925 to modify rules that define specific optimization constraints, e.g., modify a rule in a model 931 in rules repository 930; or allow a user 925 to modify the optimization constraints directly in application 910, whether the pooling optimization engine 945 is Implemented with rules technology, or not.

Manual addition module 950 is a module that allows user 925 to manually add or delete collateral loans from optimized pool(s) created by optimization engine 945, such as optimized pool A 915 and optimized pool B 920. This gives application 910 the ability to create optimized pools using a set of loans (e.g., available loan collateral 905, available loan collateral 906, and available loan collateral 907) and then add or move individual loans (e.g. unused loan inventory from other loan collateral 908) into the optimized pools to, for example, achieve specific pool statistics, etc.

In the embodiment shown, application 910 is communicatively connected to a rules repository 930, which contains the rules used by a rules engine implementation, as represented by optimization engine 945. Rules repository 930 contains optimization constraints defined in the form of rules, such as optimization models 1 . . . n 931. Rules repository 930 may also contain various other rules packages for application 910, such as pooling rules and/or payup rules (e.g. one for each trade order customer). In one embodiment, changes made to rules in repository 930 should be tightly controlled, for example, by allowing access only to authorized users (e.g., pooling rules can only be modified by a pooling policy group, payup rules can only be modified by trade order customers, etc.) via a security layer with a complete audit trail and change history. In one embodiment, user 25 may select a strategy 941 that directs application 910 to execute optimization engine 945 using one or more models 931 corresponding to the chosen strategy 941.

One of ordinary skill will recognize that the architecture and implementations shown in FIG. 9 may be altered without departing from the scope of the invention. For example, manual addition module 950 may be deleted, or optimization engine 945 may be implemented using technology other than a rules engine, eliminating the need for rules repository 930.

Figure 10:
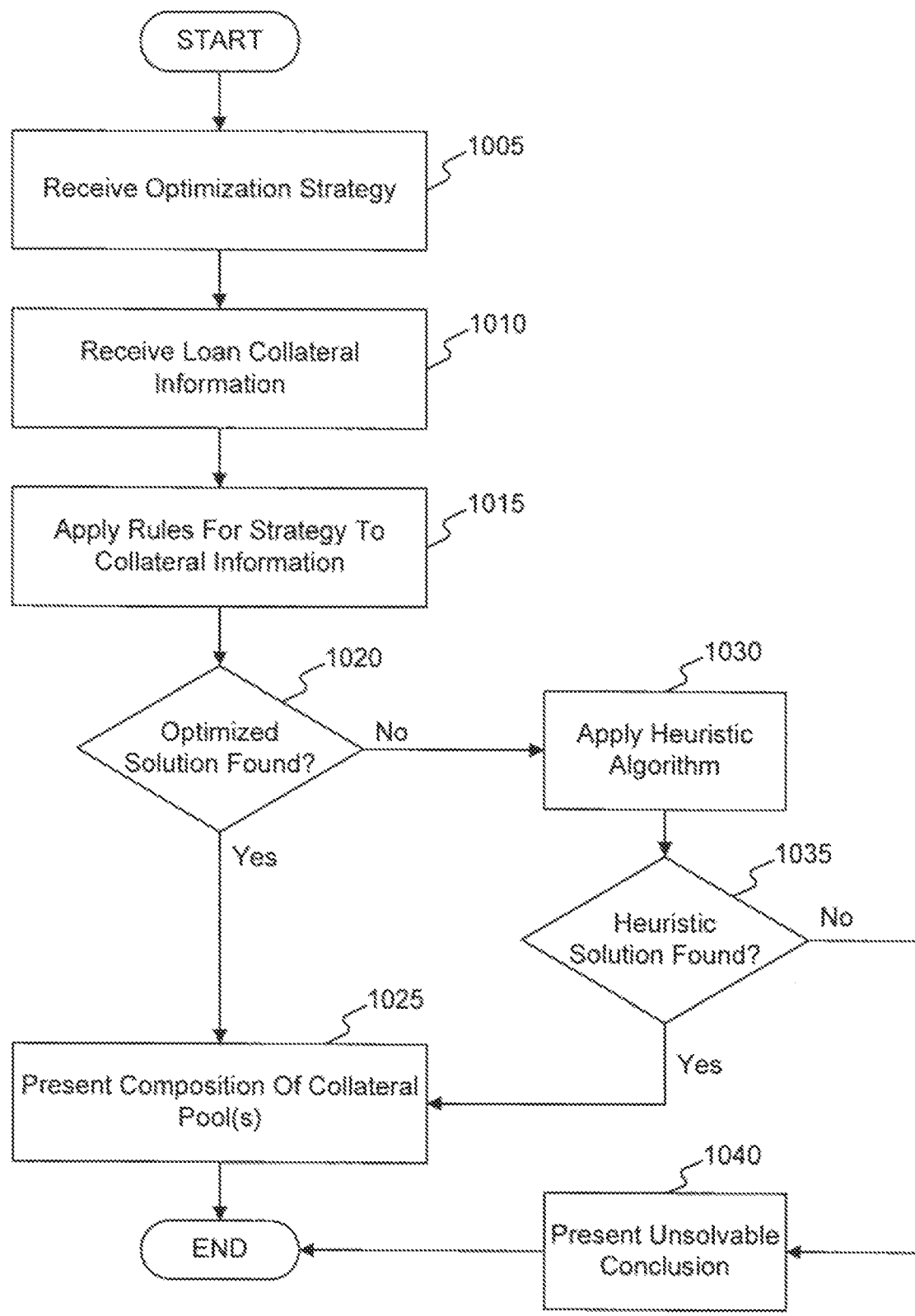
FIG. 10 is a flow chart of an exemplary process for allocating collateral loans to collateral pools according to one implementation consistent with the invention.

FIG. 10 is a flow chart of an exemplary process for allocating collateral loans to collateral pools according to one implementation consistent with the invention. In the implementation shown, the process begins by receiving an optimization strategy (stage 1005). In this implementation, the system may store various optimization models, each representing a different strategy or goal, (e.g., models 931 shown in FIG. 9), and a user (such as user 925 using GUI 940 in FIG. 9) may select the desired strategy (941) from the available models in the application (910). For example, a user may be able to select optimization based on achieving a target amount for a selected variable(s) representing a loan characteristic or attribute, such as a specified loan age for the loans allocated to an output pool or a specified maximum average FICO score for the loans allocated to an output pool, or an output pool containing LLB loans.

Next, the process receives collateral loan information (stage 1010). As shown in FIGS. 1, 2, 4, and 6, the collateral loans may be the loans of a Giant MBS(es). In one embodiment, the process may receive information about loans that are available for use as collateral from various databases, files, or electronic transfers of information. In some embodiments, the process may receive and store collateral loan information periodically over a defined interval (e.g., daily for a month), or until a minimum threshold amount of collateral loans are available, and store the information before proceeding.

The process then applies the received optimization strategy to the loan collateral information (stage 1015). As noted, the optimization strategy may analyze the characteristics of each loan that is available as collateral and assign each loan to an output pool in order to achieve a target amount for a selected loan characteristic (or characteristics) in at least one of the output loan pools. Examples include an output pool containing as many Low WAC, LLB, and specified-geographical-location-originated loans as possible (e.g., FIG. 6), or an output pool containing as many adjustable interest rate loans as possible, or an output pool containing as many High FICO loans as possible, etc. The selection of desired loan characteristics may be related to the perceived or actual market value of MBSes backed by loans having those characteristics considered in relation to the perceived or actual market value of MBSes backed by loans not having those characteristics, (which will be in the "other" output loan pool when an optimization strategy solution is found, e.g., subgroup 4b of FIG. 6). One of skill in the art will recognize that the composition of the output pools is also constrained by MBS regulations, market conditions and preferences, and the security issuer's preferences, policies, and economic constraints, among other factors.

Next, the process determines whether a solution according to the specified optimization model has been found (stage 1020). In one embodiment, processing for a solution according to the received optimization strategy may be constrained by a time limit, such as one hour, to prevent excessive solution-attempt iterations that may not result in a satisfactory solution. In one embodiment, the length of such a time limit may be specified by a system user. If an optimized solution is found using the received optimization strategy (stage 1020, Yes), then the process presents as output the composition of the collateral pools formed under the strategy (stage 1025). This output may be in the form of an electronic or paper report or data identifying the loan(s) assigned to each output pool, among other things. The report or data may also contain information or statistics about each output pool, such as the total UPB of the pool, the number of loans with certain characteristics (e.g. the number or total UPB of Low WAC loans, the number or percentage of loans originated in Florida), etc. The report or data may be used as Input to follow on processes, such as processes for securitizing the output pools.

If, on the other hand, an optimized solution Is not found using the received optimization strategy (stage 1020, No), then the process applies a heuristic algorithm to form output pools from the collateral loans (stage 1030). In one embodiment, the heuristic algorithm is a default optimization strategy used In the event that the desired optimization model solver cannot come up with a solution within given time and computing limits. The heuristic algorithms goal is to produce a feasible collateral loan to pool mapping that may not be as optimal with respect to achieving targets for a specified loan characteristic (or characteristics) In at least one of the output loan pools. In one embodiment, a user may select to apply the heuristic algorithm Instead of any other optimization strategy.

After applying the heuristic algorithm, the process determines whether a heuristic solution was found (stage 1035). If so, (stage 1035, Yes), the process presents as output the composition of the collateral pools formed under the heuristic algorithm (stage 1025). If not, (stage 1035, No), the process presents an indication, such as an error message, that the collateral loans cannot be allocated to pools using either strategy (stage 1040). This may occur, for example, if there are not enough collateral loans to form a pool of a required size, such as a pool large enough to support a particular type of MBS.

Figure 11:
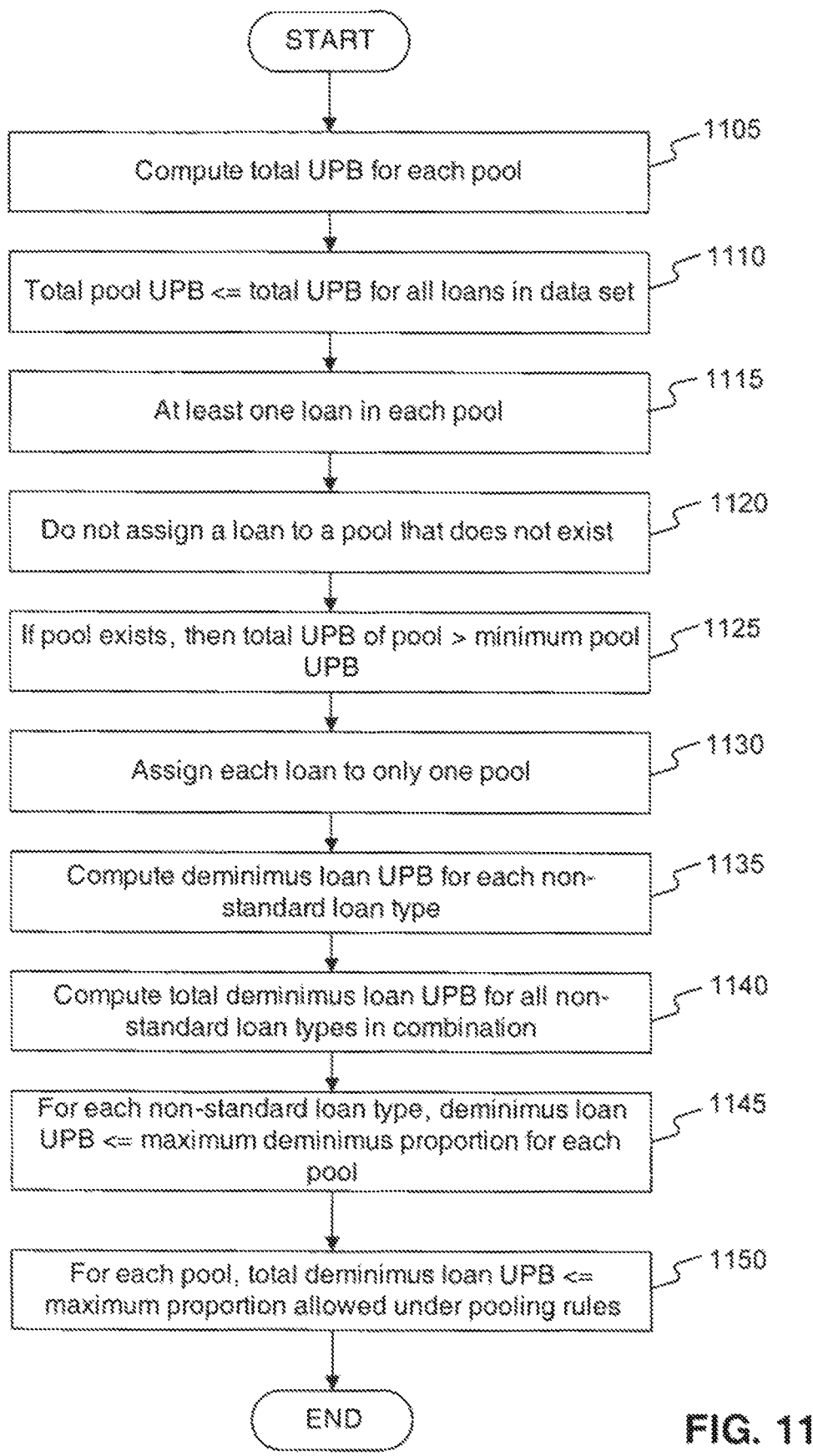
FIG. 11 is a chart representing a model of an exemplary optimization strategy consistent with the invention.

FIG. 11 is a chart representing a model of an exemplary optimization strategy consistent with the invention. In some embodiments, such a model or algorithm may be implemented as part of stage 1015 of FIG. 10, and/or the optimization process 810 shown In FIG. 8, and/or included in optimization engine 945 shown in FIG. 9. One goal of the exemplary model of FIG. 11 is to maximize the total proceeds, represented as price, to the issuer of the MBSes backed by the loan pools formed from a given group of collateral loans. This goal may be represented in a mixed integer linear program by an objective function:

$$\underset{X[M]}{\text{MAX}} \sum_{(M,L,P) \in MLPS[M,L,P]} (X[M] \times LSP[L, P] \times UPB[L]) / TUPB$$

where X[M]=loan to pool mapping binary variable; LSP[L,P]=payup amount of a loan (L) in a pool (P) (represented as price); UPB[L]=current UPB of a loan in a pool (purchase UPB for mulilender loan; contributing loan UPB for cash loan); TUPB=total UPB of loans in a pool, all loans in the dataset; and MLPS[M,L,P]=mapping of mapping variable to loan to pool, which is optimization strategy specific for a given characteristic.

This objective function may be subject to the steps and constraints of the exemplary model, as shown in FIG. 11. In this model, for comparing to constraints, the total UPB for each output pool is computed 1105, which may be done according to the function:

$$U[P] \sum_{(M,L) \in MLPS[M,L,P]} X[M] \times UPB[L]; \quad \forall P$$

where U[P]=pool UPB; X[M]=loan to pool mapping binary variable; UPB[L]=current UPB of a loan in a pool (purchase UPB for multilender loan; contributing loan UPB for cash loan); and P=set of pools (which is problem specific).

The first constraint of the model 1110 is that the total pool UPB should be less than or equal to the total UPB of all the loans in the dataset, which are all the loans available for use as collateral. This may be modeled according to the function:

$$U[P] - Y[P] \times TUPB \leq 0; \quad \forall P$$

where U[P]=pool UPB; Y[P]=binary variable indicating whether pool exists; TUPB=total UPB of loans in a pool, all loans in the dataset; and P=set of pools (which is problem specific).

The next constraint 1115 is that there must be at least one loan in each pool. This may be modeled according to the function:

$$\sum_{M \in MPS[M,P]} X[M] - Y[P] \geq 0; \quad \forall P$$

where X[M]=loan to pool mapping binary variable; Y[P]=binary variable indicating whether pool exists; and P=set of pools.

The next constraint 1120 ensures, with constraints 1110 and 1115, that if a pool does not exist, then no loan will be assigned to it. This may be modeled according to the function:

$$X[M] - Y[P] \leq 0; \quad \forall (M,P) \in MPS(M,P)$$

where X[M]=loan to pool mapping binary variable; Y[P]=binary variable indicating whether pool exists; M=the set of mapping variables, which are used to reduce the number of binary decision variables, i.e., one mapping variable defines one instance of possible mapping between a loan and a pool; P=set of pools; and MPS(M,P)=mapping of mapping variable to pool.

The next constraint 1125 ensures that if a pool exists, then the total pool UPB must be greater than the minimum pool UPB as defined in the strategy being modeled. This may be modeled according to the function:

$$U[P] - Y[P] \times MINUPB \geq 0; \quad \forall P$$

where U[P]=pool UPB; Y[P]=binary variable Indicating whether pool exists; MINUPB=minimum pool size or UPB (e.g., $1 million); and P=set of pools.

The next constraint 1130 according to this exemplary model strategy requires that each loan be assigned to only one pool. This may be modeled according to the function:

$$\sum_{M \in MLS[M,L]} X[M] = 1; \quad \forall L$$

where X[M]=loan to pool mapping binary variable; L=set of loans; M=set of mapping variables; and MLS[M,L]=mapping of mapping variable to loan.

The next function 1135 computes the "deminimus" loan UPB for loans having a limiting loan characteristic, which is used to restrict, restrain, or otherwise limit the composition of the output pools. An example of such a limiting characteristic is nonstandard loan type. "Deminimus" is a coined label used to distinguish limiting loan characteristics from target or desirable loan characteristics, (e.g., a characteristic(s) that allows a loan to be assigned to a pool with a high payup value). The deminimus loan UPB for a pool may be modeled according to the function:

$$DMV[D, P] = \sum_{(M,L) \in MLPD[M,L,P,D]} X[M] \times UPB[L]; \quad \forall D, P$$

where DMV[D,P]=deminimus loan UPB for each non-standard mortgage type in a pool (must be >=0); X[M]=loan to pool mapping binary variable; UPB[L]=current UPB (purchase UPB for multilender loan; contributing loan UPB for cash loan) of a loan in a pool; D=set of deminimus categories, which are limiting loan characteristics that are being analyzed for a given optimization strategy (i.e., problem specific), for example, nonstandard mortgage loan types, such as Co-op (CO), Relocation (RL) and Buydown (BN) mortgages; P=set of pools; and MLPD[M,L,P,D]= mapping of loan deminimus.

The next function 1140 computes the total deminimus loan UPB for all nonstandard loan types in combination, used here as another limiting characteristic. This may be modeled according to the function:

$$TD[P] = \sum_{(M,L) \in MLPE[M,L,P]} X[M] \times UPB[L]; \quad \forall P$$

where TD[P]=total deminimus loan UPS in a pool (all non-standard mortgage types combined); X[M]=loan to pool mapping binary variable; UPB[L]=current (purchase UPB for multilender loan; contributing loan UP for cash loan) UPS of a loan in a pool; P=set of pools; M=set of mapping variables; L=set of loans; and MLPE[M,L,P]=mapping of loan eligibility.

The next constraint 1145 requires that for each non-standard loan type, deminimus loan UPS for that type must be less than or equal to the maximum deminimus proportion for that pool, thus limiting the final composition of a pool. This may be modeled according to the function:

$$DMV[D,P] - DMP \times U[P] \leq 0; \quad \forall D,P$$

where DMV[D,P]=deminimus loan UPS for each non-standard mortgage type in a pool (must be >=0); DMP=maximum deminimus proportion for each non-standard mortgage (e.g., 10%); U[P]=pool UPB (must be >=0); D=set of deminimus categories; and P=set of pools.

The next constraint 1150 requires that for each pool, the total deminimus loan UPB must be less than or equal to the maximum deminimus proportion allowed according to the pooling rules (again limiting the final composition of a pool). This may be modeled according to the function:

$$TD[P] - DMT \times U[P] \leq 0; \forall P$$

where TD[P]=total deminimus loan UPB in a pool (e.g., all non-standard mortgage types combined); DMT=maximum deminimus proportion for all combination of all non-standard mortgages (e.g., 15%); U[P]=pool UPB (must be >=0); and P=set of pools.

In one embodiment consistent with the invention, the optimization mathematical model of FIG. 11 may be implemented using rules technology and a mixed integer linear program optimization solver. The output is a collateral loan to pool mapping that may be considered optimal according to the model. The model of FIG. 11 is an example, and many other optimization strategies could be modeled using similar techniques within the skill of the art.

Figure 12A:
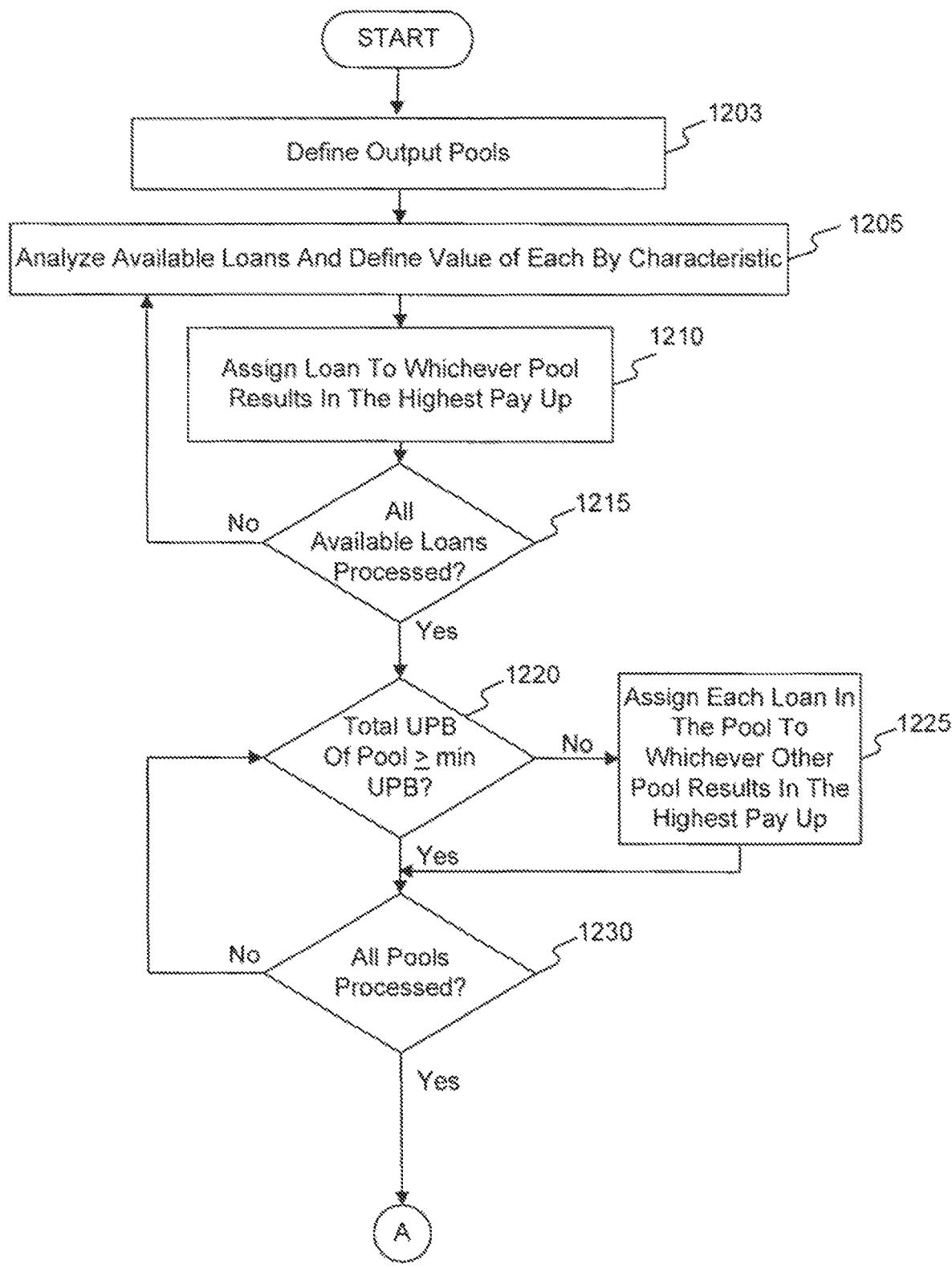
FIGS. 12A through 12C depict a flowchart chart representing an exemplary heuristic algorithm consistent with the invention.
Figure 12B:
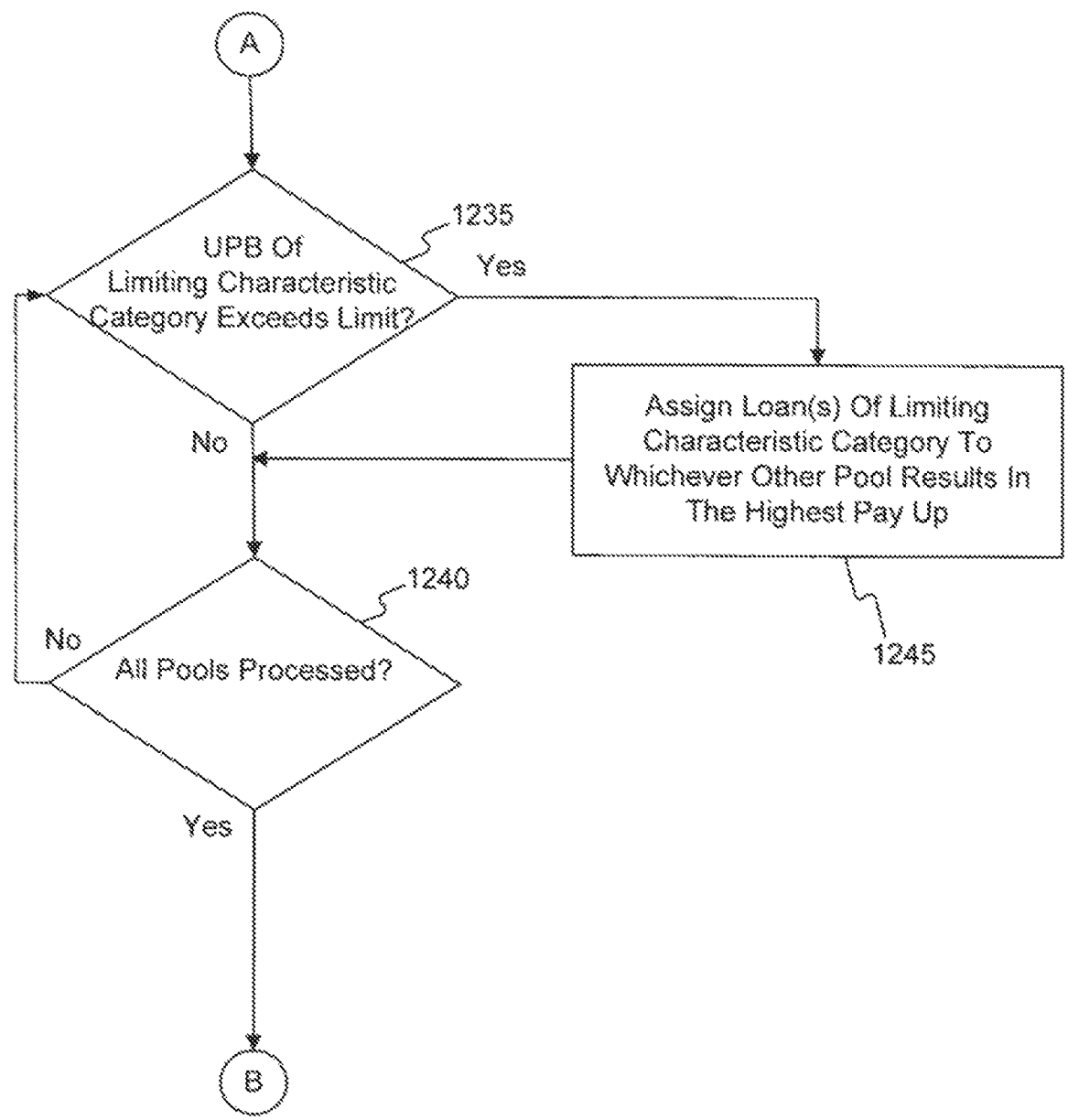
Figure 12C:
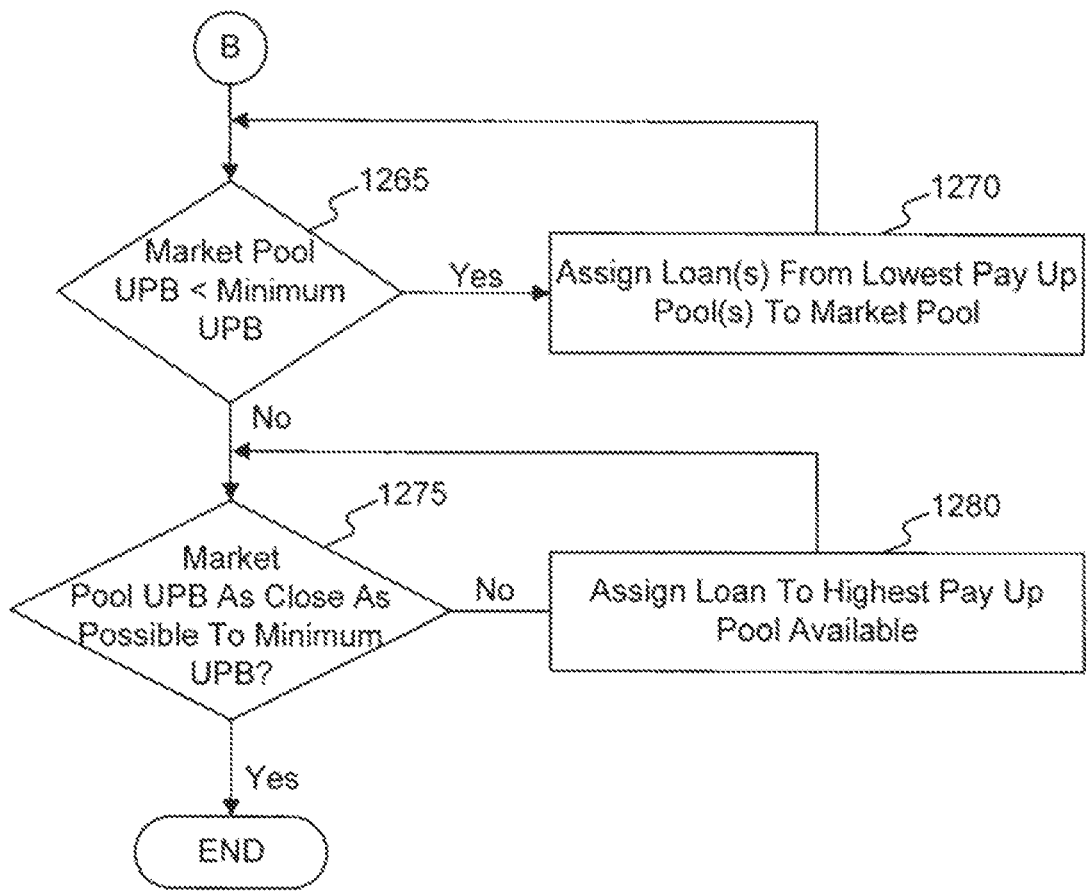

FIGS. 12A through 12C depict a flowchart chart representing an exemplary heuristic algorithm consistent with the invention. In some embodiments, such an algorithm may be implemented as part of the optimization process 810 shown in FIG. 8, and/or included in optimization engine 945 shown in FIG. 9, and/or included in stage 1030 of FIG. 10. As shown the algorithm begins with defining the output pools desired to be formed from the available collateral loans (stage 1203). For example, as shown in FIG. 4, the desired output pools are represented by subgroup M1 448 and subgroup M2 450. For another example, as shown in FIG. 6, the desired output pools are represented by subgroup 4A containing Low WAC, LLB and GEO loans, and subgroup 4 containing High WAC, HLB and Non-GEO loans. The desired output pools may be defined based on investor request, current market demand, predicted future market demand, etc.

As shown in FIG. 12A, the algorithm proceeds by analyzing the collateral loans that are available to form pools and defining the value of each according to its loan characteristics (stage 1205). Examples of available collateral loans include Giant 114 shown in FIG. 1, the Giants in giant group 210 shown in FIG. 2, and the Giants in giant group 410 shown in FIG. 4. Examples of characteristics include type of interest rate, originator, type of securing property, seasoning, GEO, WAC, WAM, LTV, LLB, etc. In one embodiment, a binary variable is used for every loan to pool mapping. If the loan's mapping variable is 1 for a specific characteristic, then the algorithm assigns the payup of the pool as the value of the loan with respect to that characteristic, and if the mapping variable is 0 for a characteristic, then the algorithm assigns 0 to the value of that loan for that characteristic. The payup or price associated with a pool may be predetermined based on market demand, specific offers, predicted future market demand, etc.

Next, the algorithm assigns each loan from the available collateral loans to whichever output pool results in the highest payup or the highest price for the loan, where the pools are defined by one or more loan characteristic (stage 1210). For example, consider a specific loan with characteristics showing it was both originated in New York and has a LLB (low loan balance), and assume the output pools include both a New York GEO pool and an LLB pool. If the loans in the New York GEO pool are more desirable or valuable, (e.g., securities backed by those loans can be sold for a higher price), than the loans in the LLB pool, (which may be determined by current market conditions, estimates of future market conditions, an offer or order from an investor, etc.), then the algorithm will assign that specific loan to the New York GEO pool instead of the LLB pool. In one embodiment, the algorithm may accomplish this by leaving the chosen mapping variable set to 1, and setting all other loan to pool mappings to 0.

The algorithm repeats the analysis (1205) and assignment (1210) stages for each loan that Is available as collateral (stage 1215, No).

After all the available loans have an initial assignment (stage 1215, Yes), the algorithm computes the total UPB for each output pool (i.e., the sum of current UPB for each loan in the pool) and determines whether the total pool UPB is greater than or equal to the minimum pool UPB as defined in the pooling rules, such as, for example, $1,000,000 (stage 1220). If not (stage 1220, No), then all loans in that pool are reassigned to another pool, such as the pool for each loan that results in the next highest pay up for the loan (stage 1225). In one embodiment, the algorithm implements this by assigning 1 to the next highest pay up pool mapping variable for each loan and 0 to the other mappings, including the loan's highest-payup-pool mapping, (which eliminates the loan-highest-payup-pool mapping from further consideration). In one embodiment, the available output pools include a "market" pool, which has a very low payup value, making it the default pool for loan assignments when all other higher-value possibilities have been exhausted.

When reassignment is complete, the algorithm determines whether all the output pools have been processed (stage 1230). If not (stage 1230, No), one of the remaining pools is analyzed to determines whether the total Pool UPB is greater than or equal to the minimum pool UPB (stage 1220). Stages 1220, 1225, and 1230 may repeat until all the output pools are analyzed for minimum UPB (stage 1230, Yes).

Next, the algorithm computes, for each pool, the sum of the loan UPB for the loans in a limiting characteristic category(s) and determines whether the sum exceeds a preset limit (stage 1235). In one embodiment, a limiting characteristic is a loan characteristic for limiting the amount of loans with that characteristic to a maximum (or minimum) amount for each output pool. In one embodiment, limiting characteristics and amounts may be defined in the pooling rules. Limiting characteristic categories may be used for several reasons: to reduce risk for a pool (e.g., by forcing some diversification of the loans in the pool), to meet government securities regulations for a pool (which will be used to back a regulated MBS), to enforce best practices for pool composition determined by an MBS issuer, etc. For example, for best practice and diversification reasons, the pooling rules may be set so that the maximum proportion of a specified type of nonstandard mortgage loans (e.g., limiting characteristic=Co-op type mortgage loans, Relocation type mortgage loans, or Buydown type mortgage loans) in an output pool is 10% of the pool. For another example, stage 1235 may ensure that the sum of the loan UPB for all the mortgage loans in a pool having a nonstandard loan characteristic (e.g., the sum of the UPB for Co-op, Relocation, and Buydown type mortgage loans) is no greater than 15% of the UPB of the entire output pool. These exemplary limiting constraints prevent overconcentration of nonstandard loans in an output pool, even though the pool may be more valuable with the overconcentration.

If the UPB of the loans In a pool with the limiting characteristic(s) exceeds the limit (stage 1235, Yes), the algorithm reassigns loan(s) with the limiting characteristic to another pool in order the meet the limit (stage 1245). For example, in one embodiment, if any limiting characteristic for a pool p1 is exceeded, the algorithm takes loans from p1 having the corresponding characteristic one by one and puts them into a possible pool p2 (i.e. a pool that loan can be assigned to in accordance with its characteristics) having the next highest-pay-up (other than the original pool). In one embodiment, when doing such a loan reassignment, the algorithm determines whether the UPB of p1 drops under the minimum UPB for a pool (see, e.g., stage 1220), and if so, considers pool p1 untenable. Some embodiments may also determine whether moving the loan to p2 makes p2 nonconforming for the limiting characteristic(s), and if so, attempt to move the loan to the next-highest-pay-up pool, e.g., p3. In one embodiment, the reassignment of loans in stage 1245 continues until the original pool p1 meets the limit for loans with the relevant limiting characteristic(s), or pool p1 is considered untenable and all its loans reassigned.

When reassignment(s) are completed as needed, the algorithm determines whether all the output pools have been processed (stage 1240). If not (stage 1240, No), another of the pools is analyzed to determine whether it meets the requirements for limiting characteristics (stage 1235). Stages 1235, 1240, and 1245 may repeat until all the output pools are analyzed with respect to limiting characteristics (stage 1240, Yes).

One of ordinary skill will recognize that the implementation shown of stages 1235 and 1245 are exemplary, and many other implementations to analyze and rearrange the composition of an output pool according to desired limitations on the loans in the pool are within the scope of the invention. For example, a pool p1 may be analyzed to determine whether it includes a minimum UPB of loans having a specified characteristic(s) and the algorithm may move loans from another pool p2 into pool p1 so as to achieve the desired minimum UPB. In another example, the algorithm may use conditions other than UPB, (e.g., number of loans), to determine whether an output pool needs adjustment to meet the requirement for loans with a specified limiting characteristic(s).

In the implementation shown in FIG. 12C, the algorithm next determines for a "market pool" of loans whether the market pool meets a minimum UPB requirement (stage 1265). As noted above, a market pool may be the default pool for available collateral loan assignments when all other higher-value pool possibilities have been exhausted, or a more optimum solution cannot be easily reached. If the market pool does not contain the minimum UPB of loans (stage 1265, Yes), then the algorithm reassigns a loan from the lowest payup pool to the market pool, raising the UPB of the market pool (stage 1270). For example, in one embodiment, the algorithm, moves a loans from least-valuable pool p1 to the market pool, provided the UPB of pool p1 remains greater than or equal to a minimum UPB set for pool p1. If after exhausting pool p1's available loans above the minimum UPB, the market pool's total UPB is still less than the desired minimum UPB for the market pool, then the algorithm begins reassigning loans from the next-least-valuable pool p2 to the market pool. If, after all the rest of the pools have been tried, the market pool cannot reach the desired minimum UPB, then the algorithm destroys the lowest-pay-up pool p1 and reassigns all of its loans to the market pool.

In the implementation shown, stages 1265 and 1270 repeat, moving loans into the market pool until the market pool meets the minimum UPB requirement (stage 1265, No).

Next, the algorithm determines for the market pool of loans whether the market pool contains close to the minimum UPB needed to meet its minimum UPB requirement (stage 1275). In this implementation, because the market pool is the lowest value pool, a goal is to assign the least number of loans possible to the market pool, which will maximize the total value of all the output pools combined. If the market pool contains more than the required minimum UPB of loans (stage 1275, No), then the algorithm reassigns as many loans as possible from the market pool into the highest pay up pool available for each loan, based on its characteristics (stage 1280). In one embodiment, the algorithm moves loans out of the market pool one by one to other possible pools, starting with the highest-pay-up pool, by checking all requirements (e.g., minimum UPB, thresholds for amounts of loans with limiting characteristics, etc.) for both the market pool and the destination pool whenever a loan Is moved. The algorithm may continue reassigning loans until some limit or other requirement is reached for either the market pool or the destination pool.

As shown, when the market pool has been adjusted to be reasonably close to the minimum UPB of loans (stage 1275, Yes), the algorithm ends. One of ordinary skill will recognize that stages may be added to, deleted from, or modified in the algorithm shown In FIG. 12 without departing from the principles of the invention. For example there may be no limiting characteristic requirements to shape the composition of the output pools, such that stages 1235 through 1240 may be deleted. For another example, stages may be added to time the processing loops or otherwise determine that the allocation problem Is unsolvable or infeasible to solve in a reasonable time period for the available collateral loans, desired output pools, and limiting characteristic restraints.

Figure 13:
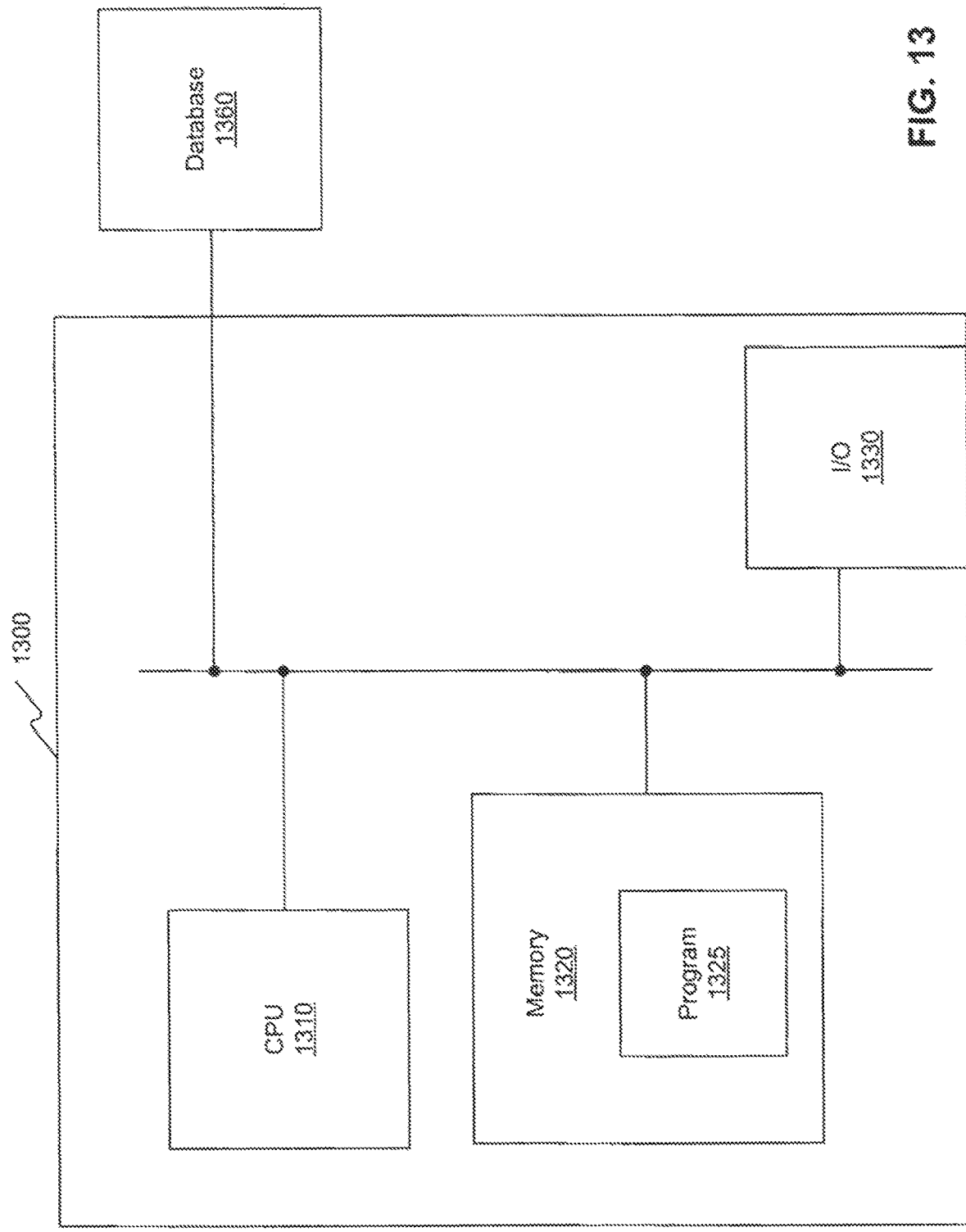
FIG. 13 illustrates an exemplary computing system that can be used to implement embodiments of the invention.

FIG. 13 illustrates an exemplary computing system 1300 that can be used to implement embodiments of the invention. The components and arrangement, however, are not critical to the Invention. One of ordinary skill will recognize that embodiments of the invention may be implemented by computers or workstations organized as shown, organized in a distributed processing system architecture, or organized in myriad suitable combinations of software, hardware, and/or firmware.

As shown, system 1300 includes a number of components, such as a central processing unit (CPU) 1310, a memory 1320, an input/output (I/O) device(s) 1330, and a database 1360 that can be implemented in various ways. For example, an integrated platform (such as a workstation, personal computer, laptop, etc.) may comprise CPU 1310, memory 1320, and I/O devices 1330. In such a configuration, components 1310, 1320, and 1330 may connect through a local bus interface and access to database 1360 (implemented as a separate database system) may be facilitated through a direct communication link, a local area network (LAN), a wide area network (WAN) and/or other suitable connections.

CPU 1310 may be one or more known processing devices, such as a microprocessor from the Pentium family manufactured by Intel™ or a mainframe-class processor. Memory 1320 may be one or more storage devices configured to store information used by CPU 1310 to perform certain functions, operations, and steps related to embodiments of the present invention. Memory 1320 may be a magnetic, semiconductor, tape, optical, or other type of storage device. In one embodiment, memory 1320 includes one or more software application programs 1325 that, when executed by CPU 1310, perform various processes consistent with the present invention. For example, memory 1320 may include a cash flow identification software application 1325 that, when executed by CPU 1310, determines which mortgage loans within a Giant MBS have certain specified characteristics. Memory 1320 may also include other programs that perform other functions consistent with embodiments of the invention, such as a program that groups identified mortgages into a pool by setting afield in each mortgage's database entry with a pool identifier, or by using a pooling optimization application.

Methods, systems, and articles of manufacture consistent with the present invention are not limited to programs configured to perform dedicated tasks. For example, memory 1320 may be configured with a program 1325 that performs several functions consistent with the invention when executed by CPU 1310. For example, memory 1320 may include a software application program that both searches database 1360 for specified characteristic mortgage loans and groups them into a pool. Alternatively, CPU 1310 may execute one or more programs located remotely from system 1300. For example, system 1300 may access one or more remote programs that, when executed, perform functions related to embodiments of the present invention. The configuration and number of programs implementing processes consistent with the invention are not critical to the invention.

Memory 1320 may be also be configured with an operating system (not shown) that performs several functions well known In the art when executed by CPU 1310. By way of example, the operating system may be Microsoft Windows™, Unix™, Linux™, an Apple™ operating system such as MAC OSX™, Personal Digital Assistant operating system such as Microsoft CE™, or other operating system. The choice of operating system, and even to the use of an operating system, is not critical to the invention.

I/O device(s) 1330 may comprise one or more input/output devices that allow data to be received and/or transmitted by system 1300. For example, I/O device 1330 may Include one or more input devices, such as a network connection, keyboard, touch screen, mouse, microphone, and the like, that enable data to be input or received from a user. Further, I/O device 1330 may Include one or more output devices, such as a network connection, display screen, printer, speaker devices, and the like, that enable data to be output or presented to a user. The configuration and number of input and/or output devices incorporated in I/O device 1330 are not critical to the invention.

Database 1360 may comprise one or more databases that store information and are accessed and managed through system 1300. By way of example, database 1360 may be an Oracle™ database, a Sybase™ database, or other relational database. One embodiment described above uses database 1360 to store Information about the mortgage loans in a Giant MBS or other MBS. Systems and methods of the present invention, however, are not limited to separate databases or even to the use of a database as other organized collections of data or memory systems will serve as well.

The foregoing description of possible Implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the Invention disclosed herein. One of ordinary skill in the art will understand how to implement the Invention in the appended claims in other ways using equivalents and alternatives that do not depart from the scope of the following claims. It is intended that the specification and examples be considered as exemplary only, with a true scope and spirit of the Invention being indicated by the following claims.

What is claimed is:

1. A computer-implemented method, performed by a processor connected via a network connection to at least one of an optimization engine, a graphical user interface, a manual addition module, and a networked database, the method comprising:
   generating, by the processor and the manual addition module, options for customizing a plurality of loans and for selecting an optimization strategy;
   displaying, by the processor via the graphical user interface, the options for customizing the plurality of loans;
   receiving, by the processor via the graphical user interface, a selection of an option as the selected optimization strategy;
   querying and retrieving, by the optimization engine from the networked database, an optimization model associated with the selected optimization strategy, wherein the optimization model utilizes at least one rule set and a mixed integer linear program optimization solver;
   analyzing, using the processor executing the at least one rule set and the mixed integer linear program optimization solver of the optimization model, a plurality of loans that back an existing mortgage-backed security to identify a first set of loans from the plurality of loans having a specific loan characteristic and a second set of loans from the plurality of loans not having the specific loan characteristic;
   directing, using the processor, cash flows from the first set of loans into a first subgroup based on whether the cash flows maximize or minimize a specific characteristic of the first subgroup, without decomposing the existing mortgage-backed security;
   directing, using the processor, cash flows from the second set of loans into a second subgroup based on whether the cash flows maximize or minimize a specific characteristic of the second subgroup, without decomposing the existing mortgage-backed security;
   creating, using the processor, a first security backed by a cash flow of the first subgroup;
   creating, using the processor, a second security backed by a cash flow of the second subgroup; and
   generating, using the processor, a report for output to an individual, the report including an indication of the plurality of loans associated with the first security, or the plurality of loans associated with the second security.

2. The method of claim 1, further comprising:
   directing, using the processor, cash flows from the first set of loans and cash flows from the second set of loans into a third subgroup, without collapsing the existing mortgage-backed security; and
   establishing, using the processor, a third security backed by a cash flow of the third subgroup.

3. The method of claim 1, further comprising:
   identifying, using the processor, the specific loan characteristic before analyzing the plurality of loans that back the existing mortgage-backed security.

4. The method of claim 1, wherein the first security and the second security are classes of a multi-class security.

5. The method of claim 4, wherein the multi-class security is a Real Estate Mortgage Investment Conduit (REMIC).

6. The method of claim 1, wherein directing cash flows from the first set of loans into a first subgroup comprises:
directing, using the processor, a prorata portion of the cash flows from the first set of loans into a first subgroup, without collapsing the mortgage-backed security; and
wherein directing cash flows from the second set of loans into a second subgroup comprises:
directing, using the processor, a prorata portion of the cash flows from the second set of loans into a second subgroup, without collapsing the mortgage-backed security.

7. The method of claim 1, wherein the existing mortgage-backed security is a Giant mortgage-backed security.

8. A computer-implemented method, performed by a processor connected via a network connection to at least one of an optimization engine, a graphical user interface, a manual addition module, and a networked database, the method comprising:
generating, by the processor and the manual addition module, options for customizing a plurality of loans and for selecting an optimization strategy;
displaying, by the processor via the graphical user interface, the options for customizing the plurality of loans;
receiving, by the processor via the graphical user interface, a selection of an option as the selected optimization strategy;
querying and retrieving, by the optimization engine from the networked database, an optimization model associated with the selected optimization strategy, wherein the optimization model utilizes at least one rule set and a mixed integer linear program optimization solver;
analyzing, using the processor executing the at least one rule set and the mixed integer linear program optimization solver of the optimization model, a plurality of loans that back an existing mortgage-backed security to identify characteristics of each loan in the plurality of loans;
assigning, using the processor, each loan to a pool among a plurality of pools based on one or more characteristics of each loan;
directing, using the processor, cash flows from the loans assigned to each pool to back a security associated with each pool among a plurality of securities associated with the plurality of pools based on whether the cash flows from the loans maximize or minimize a specific characteristic of the plurality of pools, without decomposing the existing mortgage-backed security; and
generating, using the processor, a report for output to an individual, the report including an indication of the plurality of loans associated with the first security, or the plurality of loans associated with the second security.

9. The method of claim 8, wherein assigning each loan to a pool among a plurality of pools based on one or more characteristics of each loan comprises:
determining, using the processor, which pool to assign each loan to using an algorithm for increasing the market value of the plurality of securities associated with the plurality of pools compared to prorata assignment.

10. The method of claim 9, wherein the algorithm includes limiting constraints unrelated to the market value of the plurality of securities.

11. The method of claim 8, wherein directing cash flows from the loans assigned to each pool comprises:
directing, using the processor, a prorata portion of the cash flows from the loans assigned to each pool to back a security associated with each pool among a plurality of securities associated with the plurality of pools, without collapsing the mortgage-backed security.

12. The method of claim 8, wherein the mortgage-backed security is a Giant mortgage-backed security.

13. A computer-implemented method, performed by a processor connected via a network connection to at least one of an optimization engine, a graphical user interface, a manual addition module, and a networked database, the method comprising:
creating, using a processor executing instructions stored in a memory, a collateral group containing at least one existing mortgage-backed security;
identifying, using the processor, a plurality of cash flows within the collateral group generated by mortgages that comprise the collateral group, based on a plurality of characteristics of the mortgages;
generating, by the processor and the manual addition module, options for selecting an optimization strategy;
displaying, by the processor via the graphical user interface, the options;
receiving, by the processor via the graphical user interface, a selection of an option as the selected optimization strategy;
querying and retrieving, by the optimization engine from the networked database, an optimization model associated with the selected optimization strategy, wherein the optimization model utilizes at least one rule set and a mixed integer linear program optimization solver;
creating, using the processor executing the at least one rule set and a mixed integer linear program optimization solver of the optimization model, a plurality of subgroups, each corresponding to at least one of the plurality of identified cash flows;
directing, using the processor, the plurality of cash flows to the corresponding plurality of subgroups based on whether the plurality of identified cash flows maximizes or minimizes a specific characteristic of the corresponding plurality of subgroups, wherein the at least one existing mortgage-backed security remains intact;
issuing, using the processor, a security backed by at least one of the plurality of subgroups, wherein a holder of the security is entitled to at least a portion of the cash flows directed to a subgroup that backs the security; and
generating, using the processor, a report for output to an individual, the report including an indication of the plurality of loans associated with the first security, or the plurality of loans associated with the second security.

14. The method of claim 13, wherein creating a plurality of subgroups comprises:
determining, using the processor, a set of subgroups comprising the plurality of subgroups using an algorithm designed to increase the market value of the security backed by at least one of the plurality of subgroups.

15. The method of claim 13, wherein directing the plurality of cash flows to the corresponding plurality of subgroups comprises:
directing, using the processor, a prorata portion of the plurality of cash flows to the corresponding plurality of subgroups, wherein the at least one mortgage-backed security remains intact.

16. A computer-implemented method, performed by a processor connected via a network connection to at least one of an optimization engine, a graphical user interface, a manual addition module, and a networked database, the method comprising:
- identifying, using a processor executing instructions stored in a memory, a set of mortgages having specified characteristics from a plurality of mortgages;
- generating, by the processor and the manual addition module, options for selecting an optimization strategy;
- displaying, by the processor via the graphical user interface, the options;
- receiving, by the processor via the graphical user interface, a selection of an option as the selected optimization strategy;
- querying and retrieving, by the optimization engine from the networked database, an optimization model associated with the selected optimization strategy;
- forming, using the processor executing the at least one rule set and the mixed integer linear program optimization solver of the, a collateral group containing the set of mortgages having the specified characteristics, the collateral group including at least one mortgage-backed security backed by a mortgage from the set of mortgages;
- creating, using the processor executing the optimization model, a plurality of subgroups, each corresponding to at least one of the specified characteristics;
- directing, using the processor, cash flows from each mortgage in the collateral group to at least one subgroup of the plurality of subgroups based on whether the plurality of identified cash flows maximizes or minimizes a specific characteristic of the corresponding plurality of subgroups, wherein the at least one mortgage-backed security remains intact; and
- establishing, using the processor, a security with the cash flows directed to the at least one subgroup of the plurality of subgroups.

17. The method of claim 16, wherein identifying a set of mortgages having specified characteristics from a plurality of mortgages further comprises:
- disclosing, using the processor, the set of mortgages having specified characteristics to prospective investor in the security; and
- receiving, using the processor, feedback from the prospective investor based on the disclosure; and
- wherein forming a collateral group containing the set of mortgages having the specified characteristics comprises:
- forming a collateral group containing the set of mortgages having the specified characteristics desired by the prospective investor.

18. The method of claim 16, wherein directing cash flows from each mortgages in the collateral group to at least one subgroup of the plurality of subgroups comprises:
- directing, using the processor, a prorata portion of the cash flows from each mortgages in the collateral group to at least one subgroup of the plurality of subgroups, wherein the at least one mortgage-backed security remains intact.

19. The method of claim 16, wherein forming a collateral group containing the set of mortgages having the specified characteristics comprises:
- creating, using the processor, a Giant mortgage-backed security that includes the set of mortgages having specified characteristics.

20. The method of claim 16, wherein forming a collateral group containing the set of mortgages having the specified characteristics comprises:
- determining, using the processor, the set mortgages to include in the collateral group using an optimization algorithm designed to increase the market value of securities backed by cash flows from the set of mortgages.

* * * * *